(12) United States Patent
Jang et al.

(10) Patent No.: US 8,202,669 B2
(45) Date of Patent: *Jun. 19, 2012

(54) ELECTRO-CATALYST COMPOSITIONS FOR FUEL CELLS

(75) Inventors: Bor Z. Jang, Centerville, OH (US); Aruna Zhamu, Centerville, OH (US); Jiusheng Guo, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1119 days.

This patent is subject to a terminal disclaimer.

(21) Appl. No.: 11/582,912

(22) Filed: Oct. 19, 2006

(65) Prior Publication Data

US 2008/0096093 A1   Apr. 24, 2008

(51) Int. Cl.
*H01M 4/36* (2006.01)
*H01M 4/38* (2006.01)
*H01M 8/10* (2006.01)
*B01J 31/00* (2006.01)

(52) U.S. Cl. ........ 429/523; 429/405; 429/479; 429/484; 429/485; 429/493; 429/524; 429/525; 429/526; 429/527; 429/528; 502/104; 502/122; 502/150

(58) Field of Classification Search .................. None
See application file for complete search history.

(56) References Cited

U.S. PATENT DOCUMENTS

| | | | |
|---|---|---|---|
| 4,876,115 A | 10/1989 | Raistrick | |
| 4,880,508 A | 11/1989 | Aldissi et al. | |
| 5,137,991 A | 8/1992 | Epstein et al. | |
| 5,211,984 A | 5/1993 | Wilson | |
| 5,432,023 A * | 7/1995 | Yamada et al. | 429/442 |
| 5,489,563 A * | 2/1996 | Brand et al. | 502/185 |
| 5,589,108 A | 12/1996 | Shimizu et al. | |
| 5,648,453 A | 7/1997 | Saida et al. | |
| 5,677,074 A | 10/1997 | Serpico et al. | |
| 5,846,670 A | 12/1998 | Watanabe et al. | |
| 6,015,635 A | 1/2000 | Kawahara | |
| 6,074,773 A | 6/2000 | Wilkinson et al. | |
| 6,187,467 B1 | 2/2001 | Zhang et al. | |

(Continued)

OTHER PUBLICATIONS

U.S. Appl. No. 11/522,580, filed Sep. 19, 2006, B. Z. Jang, et al.

(Continued)

*Primary Examiner* — Barbara Gilliam
*Assistant Examiner* — Kwang Han
(74) *Attorney, Agent, or Firm* — Mark Levy; Thompson Hine LLP

(57) ABSTRACT

A precursor electro-catalyst composition for producing a fuel cell electrode. The precursor composition comprises (a) a molecular metal precursor dissolved or dispersed in a liquid medium and (b) a polymer dissolved or dispersed in the liquid medium, wherein the polymer is both ion-conductive and electron-conductive with an electronic conductivity no less than $10^{-4}$ S/cm (preferably greater than $10^{-2}$ S/cm) and ionic conductivity no less than $10^{-5}$ S/cm (preferably greater than $10^{-3}$ S/cm). Also disclosed is an electro-catalyst composition derived from this precursor composition, wherein the molecular metal precursor is converted by heat and/or energy beam to form nanometer-scaled catalyst particles and the polymer forms a matrix that is in physical contact with the catalyst particles, coated on the catalyst particles, and/or surrounding the catalyst particles as a dispersing matrix with the catalyst particles dispersed therein when the liquid is removed. The fuel cell comprising such a composition in an electrode exhibits a superior power output.

16 Claims, 9 Drawing Sheets

U.S. PATENT DOCUMENTS

| | | | |
|---|---|---|---|
| 6,326,098 B1 * | 12/2001 | Itoh et al. | 429/483 |
| 6,344,291 B1 | 2/2002 | Hitomi | |
| 6,492,295 B2 | 12/2002 | Hitomi | |
| 2004/0042955 A1 | 3/2004 | Srinivas | |
| 2004/0109816 A1 | 6/2004 | Srinivas et al. | |
| 2004/0110051 A1 * | 6/2004 | Srinivas | 429/33 |
| 2004/0110052 A1 | 6/2004 | Srinivas | |
| 2004/0144961 A1 | 7/2004 | Srinivas | |
| 2004/0166401 A1 | 8/2004 | Srinivas | |
| 2004/0169165 A1 | 9/2004 | Srinivas | |

OTHER PUBLICATIONS

U.S. Appl. No. 11/518,565, filed Sep. 11, 2006, B. Z. Jang, et al.

* cited by examiner $\sigma_1, \rho_1, R_1, t_1$ =conductivity, resistivity, resistance and thickness of the top layer (carbon fiber material)

$\sigma_3, \rho_3, R_3, t_3$ =conductivity, resistivity, resistance and thickness of the bottom layer (carbon black)

$\sigma_2, \rho_2, R_2, t_2$ =conductivity, resistivity, resistance and thickness of core layer (electrolyte)

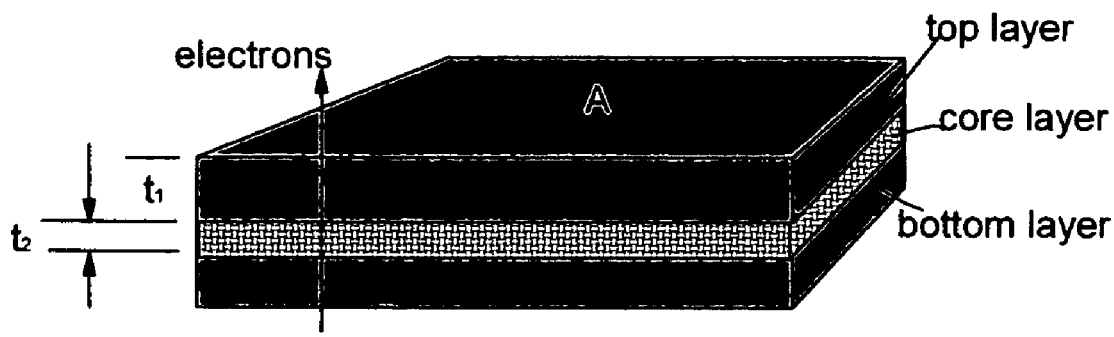

$R_1 = \rho_1 t_1/A_1 \quad R_2 = \rho_2 t_2/A_2 \quad R_3 = \rho_3 t_3/A_3 \quad A_1 = A_2 = A_3 = A_s$ $R_s = R_1 + R_2 + R_3 = (\rho_1 t_1 + \rho_2 t_2 + \rho_3 t_3)/A_s = \rho_s(t_1+t_2+t_3)/A_s$ $\rho_s = (\rho_1 t_1 + \rho_2 t_2 + \rho_3 t_3)/(t_1+t_2+t_3) \quad \sigma_s = 1/\rho_s$

FIG.3

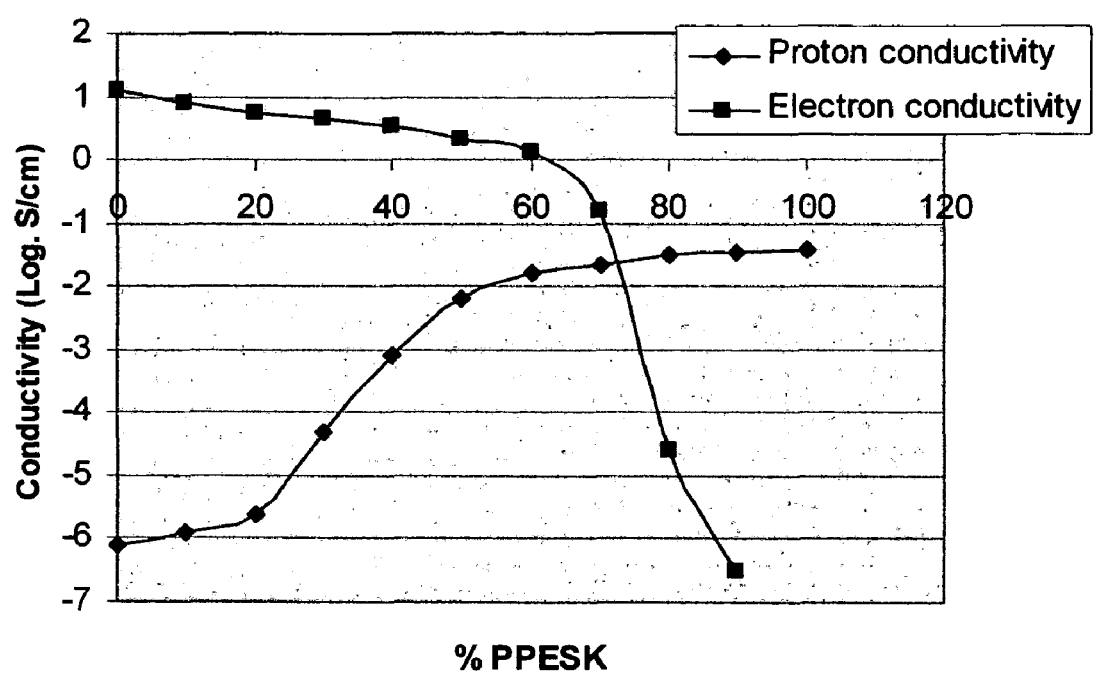
FIG.5 Proton and electron conductivity of Poly(Alkyl thiophene) + sulfonated PPESK.

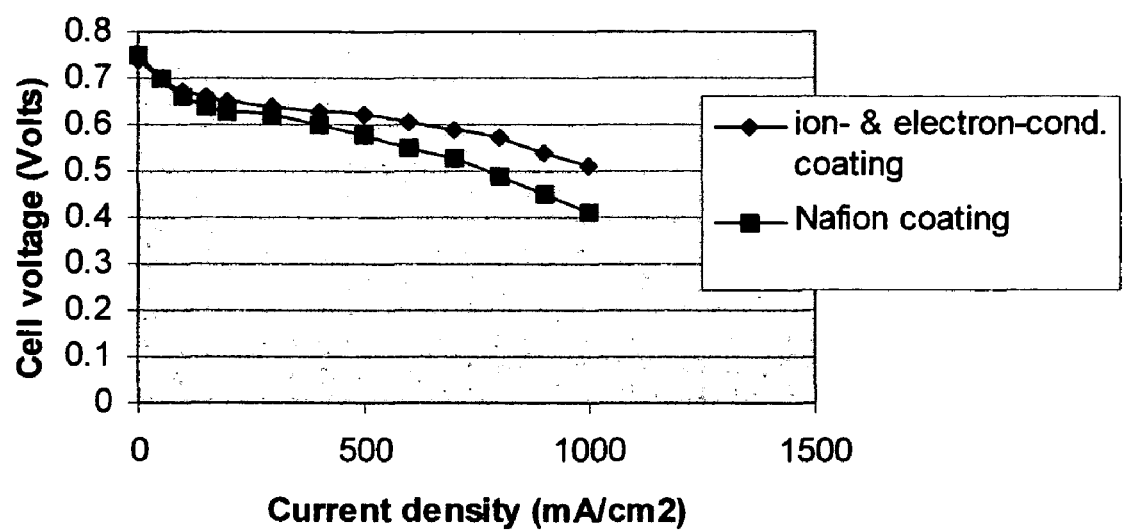
FIG.6 Fuel cells featuring different catalysts, one with a proton- and electron-conductive coating (diamond) and the other with Nafion coating.

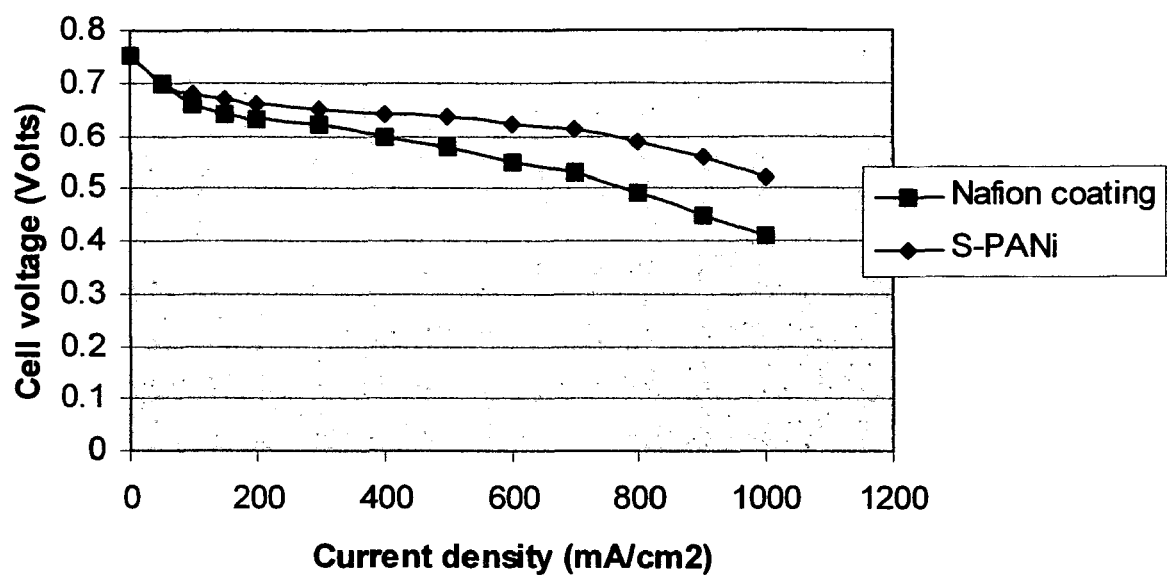
FIG.7 Fuel cells featuring different catalysts, one with a sulfonated polyaniline coating (diamond) and the other with Nafion coating.

ELECTRO-CATALYST COMPOSITIONS FOR FUEL CELLS

FIELD OF THE INVENTION

This invention relates to an electro-catalyst composition that can be used for producing a fuel cell electrode, catalyst-coated membrane (CCM), and membrane-electrode assembly (MEA). The composition forms an electrode that is both ion- and electron-conductive, which is particularly useful for ion exchange membrane-type fuel cells, particularly proton-conducting membrane fuel cells.

BACKGROUND OF THE INVENTION

The proton exchange membrane or polymer electrolyte membrane fuel cell (PEM-FC) has been a topic of highly active R&D efforts during the past two decades. The operation of a fuel cell normally requires the presence of an electrolyte and two electrodes, each comprising a certain amount of catalysts, hereinafter referred to as electro-catalysts. A hydrogen-oxygen PEM-FC uses hydrogen or hydrogen-rich reformed gases as the fuel while a direct-methanol fuel cell (DMFC) uses methanol solution as the fuel. The PEM-FC and DMFC, or other direct organic fuel cells, are collectively referred to as the PEM-type fuel cell.

A PEM-type fuel cell is typically composed of a seven-layered structure, including a central polymer electrolyte membrane for proton transport, two electro-catalyst layers on the two opposite sides of the electrolyte membrane in which chemical reactions occur, two gas diffusion layers (GDLs) or electrode-backing layers stacked on the corresponding electro-catalyst layers, and two flow field plates stacked on the GDLs. Each GDL normally comprises a sheet of porous carbon paper or cloth through which reactants and reaction products diffuse in and out of the cell. The flow field plates, also commonly referred to as bipolar plates, are typically made of carbon, metal, or composite graphite fiber plates. The bipolar plates also serve as current collectors. Gas-guiding channels are defined on a surface of a GDL facing a flow field plate, or on a flow field plate surface facing a GDL. Reactants and reaction products (e.g., water) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling and humidifying means may be added to assist in the operation of a fuel cell stack.

Several of the above-described seven layers may be integrated into a compact assembly, e.g., the membrane-electrode assembly (MEA). The MEA typically includes a selectively permeable polymer electrolyte membrane bonded between two electrodes (an anode and a cathode). A commonly used PEM is poly(perfluoro sulfonic acid) (e.g., Nafion® from du Pont Co.), its derivative, copolymer, or mixture. Each electrode typically comprises a catalyst backing layer (e.g., carbon paper or cloth) and an electro-catalyst layer disposed between a PEM layer and the catalyst backing layer. Hence, in actuality, an MEA may be composed of five layers: two catalyst backing, two electro-catalyst layers, and one PEM layer interposed between the two electro-catalyst layers. Most typically, the two electro-catalyst layers are coated onto the two opposing surfaces of a PEM layer to form a catalyst-coated membrane (CCM). The CCM is then pressed between a carbon paper layer (the anode backing layer) and another carbon paper layer (the cathode backing layer) to form an MEA. It may be noted that, some workers in the field of fuel cells refer a CCM as an MEA. Commonly used electro-catalysts include noble metals (e.g., Pt), rare-earth metals (e.g., Ru), and their alloys. Known processes for fabricating high performance MEAs involve painting, spraying, screen-printing and hot-bonding catalyst layers onto the electrolyte membrane and/or the catalyst backing layers.

An electro-catalyst is needed to induce the desired electro-chemical reactions at the electrodes or, more precisely, at the electrode-electrolyte interfaces. The electro-catalyst may be a metal black, an alloy, or a supported metal catalyst, for example, platinum supported on carbon. In real practice, an electro-catalyst can be incorporated at the electrode-electrolyte interfaces in a PEM fuel cell by depositing a thin film of the electro-catalyst on either an electrode substrate (e.g., a surface of a carbon paper-based backing layer) or a surface of the membrane electrolyte (the PEM layer). In the former case, electro-catalyst particles are typically mixed with a liquid to form a slurry (ink or paste), which is then applied to the electrode substrate. While the slurry preferably wets the substrate surface to some extent, it must not penetrate too deeply into the substrate, otherwise some of the catalyst will not be located at the desired membrane-electrode interface. In the latter case, electro-catalyst particles are coated onto the two primary surfaces of a membrane to form a catalyst-coated membrane (CCM). The slurry, ink, or paste is hereinafter referred to as a precursor electro-catalyst composition.

Electro-catalyst sites must be accessible to the reactants (e.g., hydrogen on the anode side and oxygen on the cathode side), electrically connected to the current collectors, and ionically connected to the electrolyte membrane layer. Specifically, electrons and protons are typically generated at the anode electro-catalyst. The electrons generated must find a path (e.g., the backing layer and a current collector) through which they can be transported to an external electric circuit. The protons generated at the anode electro-catalyst must be quickly transferred to the PEM layer through which they migrate to the cathode. Electro-catalyst sites are not productively utilized if the protons do not have a means for being quickly transported to the ion-conducting electrolyte. For this reason, coating the exterior surfaces of the electro-catalyst particles and/or electrode backing layer (carbon paper or fabric) with a thin layer of an ion-conductive ionomer has been used to increase the utilization of electro-catalyst exterior surface area and increase fuel cell performance by providing improved ion-conducting paths between the electro-catalyst surface sites and the PEM layer. Such an ion-conductive ionomer is typically the same material used as the PEM in the fuel cell. An ionomer is an ion-conducting polymer. For the case of a PEM fuel cell, the conducting ion is typically the proton and the ionomer is a proton-conducting polymer. The ionomer can be incorporated in the catalyst ink (precursor electro-catalyst composition) or can be applied on the catalyst-coated substrate afterwards. This approach has been followed by several groups of researchers, as summarized in the following patents [1-9]:

1) D. P. Wilkinson, et al., "Impregnation of micro-porous electro-catalyst particles for improving performance in an electrochemical fuel cell," U.S. Pat. No. 6,074,773 (Jun. 13, 2000).
2) J. Zhang, et al., "Ionomer impregnation of electrode substrate for improved fuel cell performance," U.S. Pat. No. 6,187,467 (Feb. 13, 2001).
3) I. D. Raistrick, "Electrode assembly for use in a solid polymer electrolyte fuel cell," U.S. Pat. No. 4,876,115 (Oct. 24, 1989).
4) M. S. Wilson, "Membrane catalyst layer for fuel cells," U.S. Pat. No. 5,211,984 (May 18, 1993).

5) J. M. Serpico, et al., "Gas diffusion electrode," U.S. Pat. No. 5,677,074 (Oct. 14, 1997).
6) M. Watanabe, et al., "Gas diffusion electrode for electrochemical cell and process of preparing same," U.S. Pat. No. 5,846,670 (Dec. 8, 1998).
7) T. Kawahara, "Electrode for fuel cell and method of manufacturing electrode for fuel cell," U.S. Pat. No. 6,015,635 (Jan. 18, 2000).
8) S. Hitomi, "Solid polymer electrolyte-catalyst composite electrode, electrode for fuel cell, and process for producing these electrodes," U.S. Pat. No. 6,344,291 (Feb. 5, 2002).
9) S. Hitomi, et al. "Composite catalyst for solid polymer electrolyte-type fuel cell and process for producing the same," U.S. Pat. No. 6,492,295 (Dec. 10, 2002).
10) B. Srinivas and A. O. Dotson, "Proton Conductive Carbon Material for Fuel Cell," US 2004/0109816 (Pub. Jun. 10, 2004).
11) B. Srinivas, "Sulfonated Carbonaceous Materials," US 2004/0042955 (Pub. Mar. 4, 2004).
12) B. Srinivas, "Sulfonated Conducting Polymer-Grafted Carbon Material for Fuel Cell Applications," US 2004/0110051 (Pub. Jun. 10, 2004).
13) B. Srinivas, "Conducting Polymer-Grafted Carbon Material for Fuel Cell Applications," US 2004/0110052 (Pub. Jun. 10, 2004).
14) B. Srinivas, "Metallized Conducting Polymer-Grafted Carbon Material and Method for Making," US 2004/0144961 (Pub. Jul. 29, 2004).
15) B. Srinivas, "Conducting Polymer-Grafted Carbon Material for Fuel Cell Applications," US 2004/0166401 (Pub. Aug. 26, 2004).
16) B. Srinivas, "Sulfonated Conducting Polymer-Grafted Carbon Material for Fuel Cell Applications," US 2004/0169165 (Pub. Sep. 2, 2004).

However, this prior-art approach [1-9] of ionomer impregnation into the electrode layer and/or onto electro-catalyst particle surfaces has a serious drawback in that the ionomer commonly used as the PEM material, although ion-conducting (proton-conducting), is not electronically conducting. This is due to the consideration that a proton-exchange membrane, when serving as the solid electrolyte layer, cannot be an electronic conductor; otherwise, there would be internal short-circuiting, resulting in fuel cell failure and possible fire hazard. Such an electronically non-conductive material, when coated onto the surface of a catalyst particle or carbon paper fiber, will render the catalyst particle or carbon fiber surface electronically non-conductive. This would prevent the electrons generated at the catalyst sites from being quickly collected by the anode electrode substrate layer and the current collector, thereby significantly increasing the Ohmic resistance and reducing the fuel cell performance. We felt that this impregnation or coating material should not be the same ionomer used as the PEM material.

In our co-pending applications [Bor Z. Jang, Aruna Zhamu, and Jiusheng Guo, "Process for Producing Fuel Cell Electrode, Catalyst-Coated Electrode, and Membrane-Electrode Assembly," U.S. patent application Ser. No. 11/522,580 (Sep. 19, 2006) and "Electro-catalyst Composition, Fuel Cell Electrode, and Membrane-Electrode Assembly," U.S. patent application Ser. No. 11/518,565 (Sep. 11, 2006)], we disclosed a new class of electro-catalyst compositions and the processes for producing these compositions and their derived electrodes, catalyst-coated membranes (CCMs), and membrane electrode assemblies (MEAs) for PEM fuel cell applications. The electro-catalyst composition and a precursor electro-catalyst composition (e.g., ink or suspension), when used in the formation of a fuel cell catalytic electrode layer, results in a significantly improved power output. The precursor electro-catalyst composition, when deposited onto a substrate with the liquid removed, forms an electro-catalyst composition that essentially constitutes an electrode layer (a catalytic anode or cathode film), which is typically sandwiched between a carbon paper layer and a PEM layer.

This new electro-catalyst composition in the co-pending application Ser. No. 11/518,565 (Sep. 11, 2006) comprises: (a) a catalyst un-supported or supported on an electronically conducting carrier (e.g., carbon black particles, CB); and (b) an ion-conducting and electron-conducting coating/impregnation material in physical contact with the catalyst (e.g., this impregnation material is coated on a surface of the carrier or the catalyst particles are embedded in this impregnation material), wherein the coating/impregnation material has an electronic conductivity no less than $10^{-4}$ S/cm (preferably no less than $10^{-2}$ S/cm) and an ion conductivity no less than $10^{-5}$ S/cm (preferably no less than $10^{-3}$ S/cm). Typically, this coating/impregnation material is not chemically bonded to either the carbon black surface or the catalyst and this coating/impregnation material forms a contiguous matrix with the catalyst particles dispersed therein. This contiguous matrix, along with the conductive CB particles, forms bi-networks of charge transport paths (one for electrons and the other for protons) in a fuel cell electrode, leading to much improved fuel cell performance with much reduced resistive loss, higher catalyst utilization efficiency, and higher cell output voltage. This co-pending application [Ser. No. 11/518,565 (Sep. 11, 2006)] also discloses a precursor composition (e.g., an ink) that leads to the formation of the desired electro-catalyst composition or catalytic electrode by simply removing the liquid ingredient from the ink (no chemical treatment required and no chemical bonding or reaction involved).

The present application discloses another class of precursor electro-catalyst compositions that lead to the desired electro-catalyst composition by removing the liquid medium from the composition and inducing a chemical conversion or reaction of other ingredient(s) in the precursor composition. This precursor electro-catalyst composition comprises a precursor molecular metal, which can be chemically converted to nano-scaled catalyst particles via heating or energy beam exposure (e.g., UV light, ion beam, Gamma radiation, or laser beam) during or after the precursor composition is deposited with its liquid ingredient being removed. The process for producing an electrode, its CCM and MEA from this precursor electro-catalyst composition is disclosed in [U.S. Ser. No. 11/522,580 (Sep. 19, 2006)].

It may be noted that Srinivas [Ref. 10-16] prepared a group of sulfonated carbon black (CB) or conducting polymer-grafted CB particles for fuel cell applications. The sulfonated carbon material was typically obtained by reacting an anhydride with a sulfuric acid to first obtain an organic sulfate intermediate, which was then reacted with CB to impart $SO_3H$ groups to the CB. Alternatively, a multiple-step diazoitization was used to impart $\Phi$-$SO_3H$ groups ($\Phi$=a benzene ring). These groups were then coated with or bonded to a conducting polymer to improve the electronic conductivity of surface-treated CB particles. Further alternatively, a complex oxidative polymerization step was taken to graft a conducting polymer to CB surface, followed by sulfonation, or to obtain a grafted sulfonated conducting polymer from a sulfonated monomer [12-16]. The technology proposed by Srinivas is vastly different and patently distinct from our technology as represented by the present and the two co-pending applications in the following ways:
(1) Srinivas's compositions are basically carbon black (CB) particles with their surfaces chemically bonded with either SO$_3$H type functional groups or a mono-layer of conductive polymer chains. In essence, these are just surface-modified CB particles that contain a minute amount of surface functional groups and chains. In the resulting electrode, individual CB particles were being packed together but remaining as discrete particles (FIG. 1 of Ref. 12-14). In contrast, the coating or impregnation material in our inventions is NOT chemically bonded to either the CB surface or the catalyst. This coating or impregnation material serves to form a contiguous matrix with the catalyst particles dispersed therein in such a fashion that the catalyst particles or their supporting CB particles do not have to form a contiguous structure in order to maintain two charge transport paths (one for electrons and the other for proton). This matrix material is both electron- and proton-conducting. When the un-supported catalysts or supported catalysts, along with the matrix material, are cast into a thin electrode layer, the matrix material automatically provides the two charge transport networks (whether the catalyst particles or CB particles form a continuous network or not).

(2) Srinivas's compositions did not include those with un-supported catalyst particles.

(3) Srinivas's compositions involved complicated and time-consuming surface chemical bonding, grafting, and/or polymerization procedures. In contrast, our compositions involve physically dispersing catalysts or carbon-supported catalysts in a fluid (a benign solvent such as a mixture of water and isopropanol in which a proton- and electron-conducting polymer is dissolved). No chemical reaction is involved.

(4) In the case of surface functionalization [10,11], an electronically non-conducting moiety is interposed between the CB and the conducting polymer, which could significantly reduce the local electron conductivity.

(5) It is known that there are only a small number of functional groups that can be chemically bonded to a carbon surface and, hence, a very limited number of polymer chains are grafted to the surface. Such a surface-treated CB still has limited conductivity improvements. In fact, Srinivas could not even measure the electron and proton conductivity of these mono-layers of surface groups or grafted polymer chains. He had to mix the surface bonded CB particles with Nafion® prior to conductivity measurement. The conductivity values obtained are not representative of the conductivities of surface-treated CB particles.

(6) Although Srinivas's CB particles might be individually proton- and electron-conductive on the surface, they must cluster together to form a contiguous structure to maintain an electron-conducting path and a proton-conducting path. This is not always possible when they are used to form an electrode bonded to a PEM surface or a carbon paper surface. Due to only an extremely thin layer of chemical groups or chains being bonded to an individual CB particle, the resulting electrode can be very fragile and interconnected pores (desirable for gas diffusion) tend to interrupt their contiguity. Operationally, it is very difficult to form an integral layer of catalytic electrode from these modified CB particles alone. These shortcomings are likely the reasons why the data provided by Srinivas showed very little improvement in performance of the fuel cell featuring these coated CB particles. For instance, FIG. 8 of Ref. 10 and FIG. 8 of Ref. 12 show that the best improvement achieved by surface-bonded CB particles was a voltage increase from 0.54 V to 0.59V at 700 mA/cm$^2$, less than 10% improvement. However, a decrease in voltage was observed at higher current densities. In contrast, our electro-catalyst compositions naturally form two charge transport paths, which are unlikely to be interrupted during the electrode formation process. We have consistently achieved outstanding fuel cell performance improvements (greater than 20% in many cases).

A measure of the fuel cell performance is the voltage output from the cell for a given current density. Higher performance is associated with a higher voltage output for a given current density or higher current density for a given voltage output, resulting in a higher power output. More effective utilization of the electro-catalyst, particularly through optimization of the electron and ion transfer rates, enables the same amount of electro-catalyst to induce a higher rate of electrochemical conversion in a fuel cell resulting in improved performance. This was the main object of the present invention.

SUMMARY OF THE INVENTION

The present invention provides a precursor electro-catalyst composition for use in the production of a fuel cell electrode, catalyst-coated membrane (CCM), or membrane electrode assembly (MEA). The precursor composition comprises (a) a molecular metal precursor dissolved or dispersed in a liquid medium and (b) a polymer dissolved or dispersed in this liquid medium; wherein the polymer is both ion-conductive and electron-conductive with an electronic conductivity no less than $10^{-4}$ S/cm and ionic conductivity no less than $10^{-5}$ S/cm.

The invention also provides an electro-catalyst composition derived from this precursor composition wherein the molecular metal precursor is converted by heat and/or energy beam to form nanometer-scaled catalyst particles and the polymer forms a matrix material that is in physical contact with the catalyst particles, coated on the catalyst particles, and/or surrounding the catalyst particles as a dispersing medium with the catalyst particles dispersed therein when the liquid is removed.

Preferably, the electronic conductivity is no less than $10^{-2}$ S/cm and the ion proton conductivity is no less than $10^{-3}$ S/cm. The catalyst may be selected from transition metals, alloys, mixtures, and oxides that can be made into nanoscaled particles that stand alone or are supported on a conducting particulate material such as carbon black. Hence, the molecular metal precursor may comprise a metal-containing molecular compound selected from the group consisting of organo-metallics with at least a carbon-metal bond; metal organics containing at least an organic ligand with a metal-to-non-metal bond; and inorganic compounds selected from metal nitrates, metal halides, carboxylates, alkoxides, ammonium salts of platinates, complex compounds of platinum, iridium, ruthenium and palladium, and metal salts of platinum, iridium, ruthenium and palladium; and combinations thereof.

Preferably, the matrix material comprises a polymer which is an ion- and electron-conductive polymer or a mixture of a proton-conducting polymer and an electron-conducting polymer. The proton-conducting polymer may be selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly(ether ketone), sulfonated poly(ether ether ketone), sulfonated polystyrene, sulfonated polyimide, sulfonated styrene-butadiene copolymers, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated polyvinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof.

The electrically conducting polymer may comprise a polymer selected from the group consisting of sulfonated polyaniline, sulfonated polypyrrole, sulfonated poly thiophene, sulfonated bi-cyclic polymers, their derivatives, and combinations thereof. These polymers are themselves also good proton-conductive materials.

The incorporation of such an ion- and proton-conducting polymer in an electro-catalyst composition makes a fuel cell electrode consist of bi-networks of charge transport paths (one for electrons and the other for proton). Optionally, substantially interconnected pores may be formed in the electrode to help form a diffusion path for the fuel (e.g., hydrogen) or oxidant (e.g., oxygen). In this way, the whole electrode structure is basically an intertwine 3-D network of three paths for electrons, protons, and electro-chemical reactants, respectively.

BRIEF DESCRIPTION OF THE DRAWINGS

FIG. 3 A three-material model for a local catalyst-electrolyte-carbon fiber region in a prior-art fuel cell electrode.

FIG. 5 The electron and proton conductivities of an ion-conductive and electron-conductive polymer mixture.

FIG. 6 The polarization curves (40° C.) of two fuel cells, one containing electrode catalyst particles embedded in an ion- and electron-conductive polymer blend and the other containing electrode catalyst particles embedded in an ion-conductive (but not electron-conductive) polymer (Nafion®) matrix.

FIG. 7 The polarization curves (40° C.) of two fuel cells, one containing electro-catalyst particles embedded in an ion- and electron-conductive polymer (sulfonated polyaniline) and the other containing electrode catalyst particles embedded in an ion-conductive (but not electron-conductive) polymer (Nafion®).

DETAILED DESCRIPTION OF THE PREFERRED EMBODIMENTS

A hydrogen-oxygen PEM-FC using hydrogen gas as the fuel and oxygen as the oxidant may be represented by the following electro-chemical reactions:

Anode: $H_2 \rightarrow 2H^+ + 2e^-$     (Eq. (1))

Cathode: $\frac{1}{2}O_2 + 2H^+ + 2e^- \rightarrow H_2O$     (Eq. (2))

Total reaction: $H_2 + \frac{1}{2}O_2 \rightarrow H_2O$     (Eq. (3))

Figure 1:
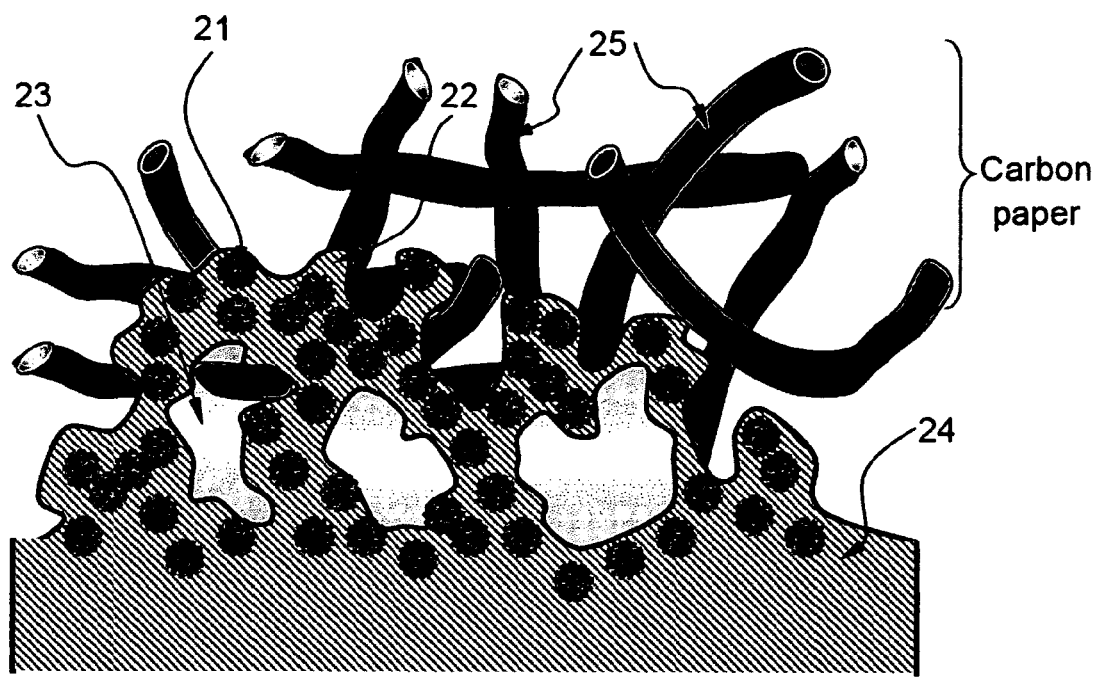
FIG. 1 Schematic of a prior-art PEM fuel cell electrode structure.

Both electrode reactions proceed only at a three-phase interface which allows the reception of gas (hydrogen or oxygen) and the delivery or reception of proton ($H^+$) and electron ($e^-$) at the same time. An example of the prior art electrode having such a function is a solid polymer electrolyte-catalyst composite electrode comprising a solid polymer electrolyte and catalyst particles. FIG. 1 schematically shows the structure of such a prior art electrode. This electrode is a porous electrode comprising catalyst particles 21 and a solid polymer electrolyte 22 (the coating/impregnation material) three-dimensionally distributed in admixture and having a plurality of pores 23 formed thereinside. The catalyst particles hopefully form an electron-conductive channel, the coating/impregnation material forms a proton-conductive channel, and the pores form a channel for the supply and discharge of oxygen, hydrogen or water as by-product. The three channels are three-dimensionally distributed and numerous three-phase interfaces which allow the reception or delivery of gas, proton ($H^+$) and electron ($e^-$) at the same time are formed in the electrode, providing sites for the electrode reaction. In this diagram, reference numeral 24 represents an ion-exchange membrane (the PEM layer, which is typically the same material as the coating/impregnation material 22) while numeral 25 represents carbon or graphite fibers in a sheet of carbon paper as a catalyst backing layer.

The preparation of an electrode having such a structure has heretofore been accomplished typically by a process that comprises (a) preparing a paste of catalyst particles and, optionally, poly tetrafluoroethylene (PTFE) particles dispersed in a liquid, (b) applying (dispensing, depositing, spraying, or coating) the paste to a surface of a PEM or a porous carbon electrode substrate (carbon paper) of an electro-conductive porous material to make a catalyst film (normally having a layer thickness of from 3 to 30 µm), (c) heating and drying the film, and (d) applying a solid polymer electrolyte solution to the catalyst film so that the film is impregnated with the electrolyte (the coating/impregnation material). Alternatively, the process comprises applying a paste made of catalyst particles, PTFE particles, and a solid polymer electrolyte solution to a PEM or a porous carbon electrode substrate to make a catalyst film and then heating and drying the film. The solid polymer electrolyte solution may be obtained by dissolving the same composition as the aforementioned ion-exchange membrane (PEM) in an alcohol. PTFE particles are typically supplied within a solution with the particles dispersed therein. PTFE particles typically have a particle diameter of approximately 0.2-0.3 µm. Catalyst particles are typically Pt or Pt/Ru nano particles supported on carbon black particles.

Figure 2:
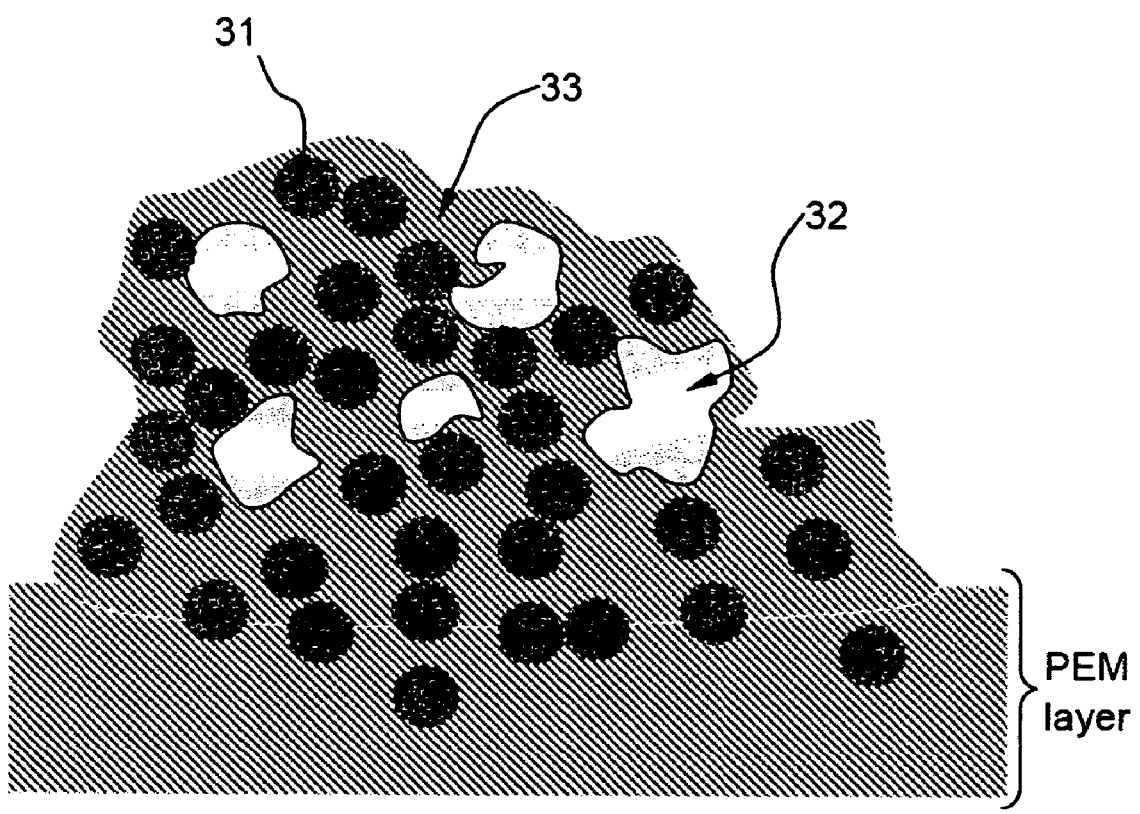
FIG. 2 Schematic of another prior-art PEM fuel cell electrode structure.

The aforementioned solid polymer electrolyte-catalyst composite electrode has the following drawbacks: The solid polymer electrolyte-catalyst composite electrode has a high electrical resistivity, which may be explained as follows. When catalyst particles are mixed with solid polymer electrolyte solution to prepare a paste, the catalyst particles are covered with solid polymer electrolyte film having extremely low electronic conductivity ($10^{-16}$-$10^{-13}$ S/cm). Upon completion of a film-making process to prepare an electrode, pores 32 (FIG. 2) and the non-conductive solid polymer electrolyte 33 tend to separate or isolate catalyst particles 31. The formation of a continuous catalyst particle passage (electron-conducting channel) is inhibited or interrupted, although a continuous solid electrolyte passage (proton-conducting channel) is maintained, as shown in the sectional view of electrode of FIG. 2.

Furthermore, by pressing the catalyst-electrolyte composite composition layer against the PEM layer to make a catalyst-coated membrane (CCM) or membrane electrode assembly (MEA), a significant amount of the carbon-supported catalyst particles 31 tend to be embedded deep into the PEM layer (illustrated by the bottom portion of FIG. 2), making them inaccessible by electrons (if used as a cathode) or incapable of delivering electrons to the anode current collector (if used as an anode). As a result, the overall percent utilization of carbon-supported catalyst is significantly reduced.

As shown in the upper portion of FIG. 1, the electronically non-conducting solid electrolyte 22 also severs the connection between the otherwise highly conductive catalyst-supporting carbon particles 21 and the carbon fibers 25 in the electrode-catalyst backing layer (carbon paper). This problem of solid electrolyte being interposed between a supporting carbon particle (CB) and a carbon fiber is very significant and has been largely ignored by fuel cell researchers. The degree of severity of this problem is best illustrated by considering a three-layer model shown in FIG. 3. The model consists of top, core, and bottom layers that are electrically connected in series. The top layer represents a carbon fiber material, the bottom layer a carbon black particle material, and the core layer a solid electrolyte material. The total resistance ($R_S$), equivalent resistivity ($\rho_\square$), and conductivity ($\sigma_s$) of the three-layer model can be easily estimated. For the top layer (carbon fiber), the properties or parameters are given as follows: conductivity ($\sigma_1$), resistivity ($\rho_1$), resistance ($R_1$), and thickness ($t_1$). Similar notations are given for the other two layers with subscript being "2" and "3", respectively. FIG. 3 shows that the equivalent conductivity of the resulting three-layer model is $\rho_s = (\rho_1 t_1 + \rho_2 t_2 + \rho_3 t_3)/(t_1 + t_2 + t_3)$. With $t_1 = 10$ μm, $t_2 = 1$ μm, and $t_3 = 30$ nm (0.03 μm), $\rho_1 = 10^{-1}$ Ωcm, $\rho_2 = 10^{+14}$ Ωcm, and $\rho_3 = 10^{+2}$ Ωcm, we have $\sigma_s = 1/\rho_s \sim 10^{-13}$ S/cm. Assume that the electrolyte layer has a thickness as low as 1 nm (0.001 μm), the equivalent conductivity would be still as low as $\sigma s = 10^{-10}$ S/cm. It is clear that the equivalent conductivity of the local electrode environment (three-component model) is dictated by the low conductivity or high resistivity of the solid electrolyte (22 in FIGS. 1 and 33 in FIG. 2). These shockingly low conductivity values ($10^{-13}$ to $10^{-10}$ S/cm) clearly have been overlooked by all of the fuel cell researchers. It could lead to significant power loss (Ohmic resistance) in a fuel cell.

To effectively address the aforementioned issues associated with electro-catalysts and catalytic electrodes in a fuel cell in general and a PEM-type fuel cell in particular, we took a novel approach to the formulation of electro-catalysts and the formation of an electrode, CCM, and MEA. Rather than using the same solid electrolyte material as the PEM layer (which is ion-conductive but must be electronically non-conductive) as an impregnation material, we used a solid electrolyte material (that is both electron- and ion-conductive) to coat, impregnate, and/or embed catalyst particles in an electrode. These catalyst particles are nano-scaled particles that are un-supported or supported on conductive particles like carbon black (CB). Typically, in a resulting electrode (or CCM or MEA), the un-supported catalyst particles or supported catalyst particles are dispersed in such an ion- and electron-conductive electrolyte material, which is also hereinafter referred to as a matrix material. The PEM layer interposed between the anode and the cathode remains to be ion-conductive (e.g., proton-conductive) only, but not electron-conductive. In an MEA, one side of the catalytic electrode is in electronic contact with a carbon paper or cloth (a gas diffuser layer) and the opposite side is in protonic contact with the proton-conducting PEM layer.

With such an arrangement, the electrons produced at the anode can be quickly collected through the carbon paper or cloth and the protons produced at the anode can be quickly transported to and through the PEM layer without producing significant Ohmic (resistive) losses. Similarly, the electrons that move around the external circuit and come back to the cathode side can reach the cathode catalyst particles without much resistance and the protons that have transported through the PEM layer also can easily reach the catalyst particle sites. With oxygen molecules diffusing through pores or the thin matrix material coated on the catalyst particles, the cathode chemical reactions can readily proceed. In essence, the presently invented electrode that contains an ion- and electron-conductive matrix material helps to form two networks of charge transport paths, one for electrons and the other for protons. In addition, interconnected pores serve to form a facile diffusion path for fuel or oxidant molecules.

Hence, in one of our co-pending applications [U.S. patent Pending Ser. No. 11/518,565 (Sep. 11, 2006)], we utilized a specially formulated electro-catalyst composition to produce such a fuel cell electrode. The composition in such an electrode comprises: (a) a catalyst un-supported or supported on an electronically conducting solid carrier (e.g., carbon black particles) and (b) an ion- and electron-conducting material in physical contact with the catalyst, coated on the catalyst, and/or coated on a surface of the carrier, wherein the ion- and electron-conducting material has an electronic conductivity no less than $10^{-4}$ S/cm (preferably no less than $10^{-2}$ S/cm) and ion (proton) conductivity no less than $10^{-5}$ S/cm (preferably no less than $10^{-3}$ S/cm). This ion- and proton-conducting matrix material typically is not chemically bonded to carbon black; it simply is in physical contact with the catalyst or a CB surface. More typically, this matrix material serves to embed the catalyst particles, which are dispersed in the matrix as discrete particles (that may cluster together here and there, but may be largely separated from one another). They do not have to form a contiguous structure in order to render the whole electrode both electron- and proton-conducting. Rather, the matrix material is chiefly responsible for maintaining the bi-networks of charge transport paths.

Figure 4:
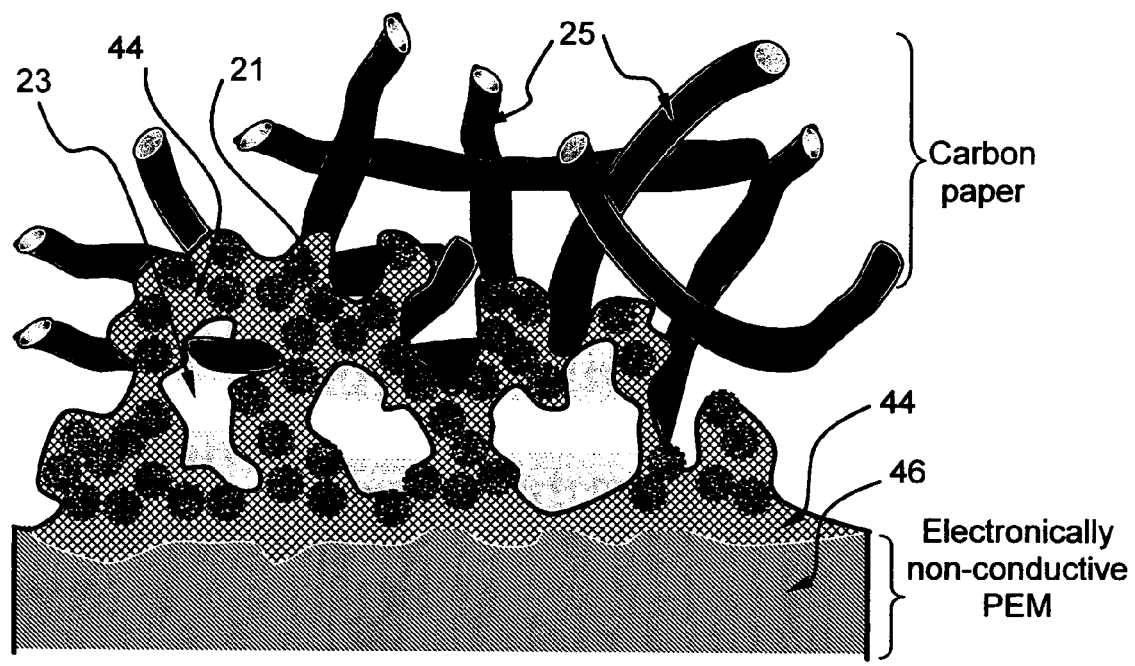
FIG. 4 Schematic of an electrode structure according to a preferred embodiment of the present invention.

In this co-pending application [U.S. patent application Ser. No. 11/518,565 (Sep. 11, 2006)], the catalyst was selected from commonly used transition metal-based catalysts such as Pt, Pd, Ru, Mn, Co, Ni, Fe, Cr, and their alloys, mixtures, and oxides. These catalysts are typically available in a nano-scaled powder form and they may be supported in CB particles which are larger but remain to be in the nanometer range (<100 nm). These supported or un-supported catalysts may be dispersed in a liquid medium in which a proton- and electron-conducting polymer is dissolved. The resulting suspension (an ink or paste), comprising supported or unsupported catalyst particles and the ion- and electron-conductive matrix material, can be deposited to form a catalytic film. This film may be bonded to one surface of a PEM layer and another film of similar composition may be bonded to the opposite surface of the PEM layer to form a catalyst-coated membrane (CCM). A CCM may be laminated between two carbon paper layers to form a membrane-electrode assembly (MEA). Alternatively, the suspension may be deposited onto a surface of a porous carbon paper to form a carbon paper-backed catalytic electrode. Another catalytic electrode is similarly fabricated. A PEM layer is then laminated between the two carbon paper-backed catalytic electrodes to form a MEA. An interface zone (catalytic electrode layer or electro-catalyst film) between a carbon paper and a PEM layer is schematically shown in FIG. 4.

In the present invention, the catalyst exists initially in a precursor molecular metal form (as opposed to the final nano-scaled catalyst particles used in the co-pending application, U.S. patent application Ser. No. 11/518,565 (Sep. 11, 2006). The precursor molecular metal is dissolved or dispersed in a liquid medium, in which a matrix polymer is dissolved or dispersed. The liquid medium may also optionally have CB particles dispersed or suspended therein. During or after the suspension is deposited and the liquid is removed, the precursor is converted into the desired nano-scaled catalyst particles, alone or supported by CB particles. These catalyst particles are typically dispersed (embedded) in the matrix polymer. The precursor conversion step may be assisted by heating or energy beam exposure (laser beam, UV, ion beam, Gamma radiation, etc.).

The selected ion- and electron-conductive material preferably comprises a polymer, which can be a homo-polymer, co-polymer, polymer blend or mixture, a semi-interpenetrating network, or a polymer alloy. In a mixture or co-polymer, one polymer component can be ion-conductive and another one electron-conductive. It is also possible that a polymer itself is conductive to both electrons and ions (e.g., protons).

With this invented catalyst composition, the resulting electrode can be used as either an anode or a cathode. As shown in FIG. 4, when it is used in an anode, hydrogen gas or organic fuel can permeate to the electrode through the pores 23 or diffuse through the ion- and electron-conductive electrolyte material 44, which is ultra-thin and can be readily migrated through via diffusion. Due to its high electronic conductivity, the electrons produced at the catalyst particles 21 can be quickly transported through the electrolyte material 44 to carbon fibers 25 of a carbon paper and be collected with little resistance or resistive (Ohmic) loss. The produced protons are also capable of migrating through the invented ion- and electron-conductive electrolyte material 44 (herein after also referred to as the coating or impregnation material) into the electronically non-conductive PEM layer, which is a conventional solid electrolyte layer interposed between an anode and a cathode.

If used as a cathode catalyst material, this solid electrolyte coating material 44 allows the electrons that come from the external load to go to the catalyst particle sites where they meet with protons and oxygen gas to form water. The protons come from the anode side, through the PEM layer, and the coating material 44 to reach the catalyst sites. Oxygen gas migrates through the pores 23 or the electrolyte coating material 44 via diffusion. Again, the electrons are capable of being transported into the cathode without any significant Ohmic loss due to the high electronic conductivity of electrolyte material 44.

In one preferred embodiment, the ion-conductive and electron-conductive coating material 44 comprises a polymer that is by itself both ion-conductive and electron-conductive. Examples of this type polymer are sulfonated polyaniline compositions, as described by Epstein, et al. (U.S. Pat. No. 5,137,991, Aug. 11, 1992):

where $0 \leq y \leq 1$, $R_1$, $R_2$, $R_3$, $R_4$, $R_5$, and $R_6$ are independently selected from the group consisting of H, $SO_3^-$, $SO_3H$, $-R_7SO_3^-$, $-R_7SO_3H$, $-OCH_3$, $-CH_3$, $-C_2H_5$, $-F$, $-Cl$, $-Br$, $-I$, $-OH$, $-O^-$, $-SR_7$, $-OR_7$, $-COOH$, $-COOR_7$, $-COR_7$, $-CHO$, and $-CN$, wherein $R_7$ is a $C_1$-$C_8$ alkyl, aryl, or aralkyl group, and wherein the fraction of rings containing at least one $R_1$, $R_2$, $R_3$, or $R_4$ group being an $SO_3^-$, $SO_3H$, $-R_7SO_3^-$, or $-R_7SO_3H$ that varies from approximately 20% to 100%. It may be noted that this class of polymers was developed for applications that made use of their electronic properties. Due to their high electronic conductivity, these polymers cannot be used as a PEM interposed between an anode and a cathode in a fuel cell (PEM must be electronically non-conductive to avoid internal short-circuiting in a fuel cell). Hence, it is no surprise that the proton conductivity of these polymers has not been reported by Epstein, et al.

It is of interest at this juncture to re-visit the issue of ion and electron conductivities for this coating material. The proton conductivity of a conventional PEM material is typically in the range of $10^{-3}$ S/cm to $10^{-1}$ S/cm (resistivity $\rho$ of $10^1$ $\Omega$-cm to $10^3$ $\Omega$-cm). The thickness (t) of a PEM layer is typically in the vicinity of 100 μm and the active area is assumed to be A=100 cm². Then, the resistance to proton flow through this layer will be $R=\rho(t/A)=10^{-3}\Omega$ to $10^{-1}\Omega$. Further assume that the resistance of the catalyst coating material (the ion- and electron-conductive material) will not add more than 10% additional resistance, then the maximum resistance of the coating layer will be $10^{-4}\Omega$ to $10^{-2}\Omega$. With a coating layer thickness of 1 μm, the resistivity to proton flow cannot exceed $10^2$ $\Omega$-cm to $10^4$ $\Omega$-cm (proton conductivity no less than $10^{-4}$ S/cm to $10^{-2}$ S/cm). With an intended coating layer thickness of 0.1 μm (100 nm), the proton conductivity should be no less than $10^{-5}$ S/cm to $10^{-3}$ S/cm.

Similar arguments may be used to estimate the required electronic conductivity of the coating layer. Consider that the electrons produced at the catalyst surface have to pass through a coating layer (0.1 μm or 100 nm thick) and a carbon paper layer (100 μm in thickness with average transverse conductivity of $10^{-1}$ S/cm to $10^{+1}$ S/cm). A reasonable requirement is for the coating layer to produce a resistance to electron flow that is comparable to 10% of the carbon paper resistance. This implies that the electronic conductivity of the coating material should be in the range of $10^{-3}$ S/cm to $10^{-1}$ S/cm. These values can be increased or decreased if the coating thickness is increased or decreased. It may be further noted that conventional PEM materials have an electronic conductivity in the range of $10^{-16}$-$10^{-13}$ S/cm, which could produce an enormous power loss.

We therefore decided to investigate the feasibility of using sulfonated polyaniline (S-PANi) materials as a component of an electro-catalyst material. After an extensive study, we have found that the most desirable compositions for use in practicing the present invention are for $R_1$, $R_2$, $R_3$, and $R_4$ group in Formula I being H, $SO_3^-$ or $SO_3H$ with the latter two varied

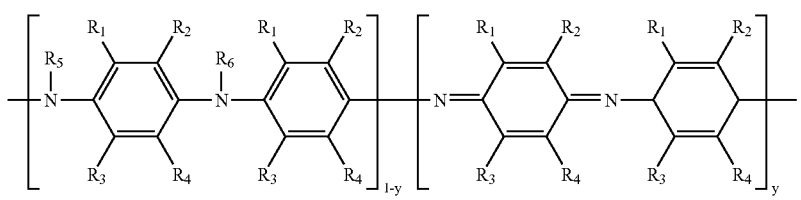

(Formula I)

between 30% and 75% (degree of sulfonation between 30% and 75%). The proton conductivity of these $SO_3^-$- or $SO_3H$-based S-PANi compositions increases from $3 \times 10^{-3}$ S/cm to $4 \times 10^{-2}$ S/cm and their electron conductivity decreases from 0.5 S/cm to 0.1 S/cm when the degree of sulfonation is increased from approximately 30% to 75% (with y being approximately 0.4-0.6). These ranges of ion and proton conductivities are reasonable, particularly when one realizes that only a very thin film of S-PANi is used (typically much thinner than 1 μm and can be as thin as nanometers). A polymer of this nature can be used alone as an ion- and electron-conductive material. We have further found that these polymers are soluble in a wide range of solvents and are chemically compatible (miscible and mixable) with the commonly used proton-conductive polymers such as those represented by Formula IV-VII, to be described later. Hence, these S-PANi polymers also can be used in combination with an ion-(proton-)conductive polymer to coat the electro-catalyst particles.

The aforementioned class of S-PANi was prepared by sulfonating selected polyaniline compositions after polymer synthesis. A similar class of soluble aniline polymer could be prepared by polymerizing sulfonic acid-substituted aniline monomers. The synthesis procedures are similar to those suggested by Shimizu, et al. (U.S. Pat. No. 5,589,108, Dec. 31, 1996). The electronic conductivity of this class of material was found by Shimizu, et al. to be between 0.05 S/cm and 0.2 S/cm, depending on the chemical composition. However, proton conductivity was not measured or reported by Shimizu, et al. We have found that the proton conductivity of this class of polymers typically ranges from $4 \times 10^{-3}$ S/cm to $5 \times 10^{-2}$ S/cm, depending on the degree of sulfonation. It appears that both ion (proton) and electron conductivities of these polymers are well within acceptable ranges to serve as an ion- and electron-conductive polymer for use in the presently invented fuel cell catalyst compositions. Again, these polymers are soluble in a wide range of solvents and are chemically compatible (miscible and mixable) with commonly used proton-conductive polymers such as those represented by Formula IV-VII, to be described later. Hence, these polymers not only can be used alone as an ion- and electron-conductive polymer, but also can be used an electron-conductive polymer component that forms a mixture with a proton-conductive polymer.

The needed ion- and electron-conducting matrix polymer can be a mixture or blend of an electrically conductive polymer and an ion-conductive polymer with their ratio preferably between 20/80 to 80/20. The electron-conductive polymer component can be selected from any of the π electron conjugate chain polymers, doped or un-doped, such as derivatives of polyaniline, polypyrrole, polythiophene, polyacetylen, and polyphenylene provided they are melt- or solution-processable. A class of soluble, electron-conductive polymers that can be used in the present invention has a bi-cyclic chemical structure represented by Formula II:

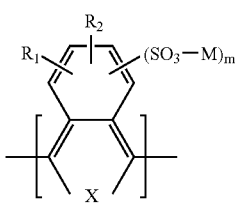

(Formula II)

wherein $R_1$ and $R_2$ independently represent a hydrogen atom, a linear or branched alkyl or alkoxy group having 1 to 20 carbon atoms, a primary, secondary or tertiary amino group, a trihalomethyl group, a phenyl group or a substituted phenyl group, X represents S, O, Se, Te or $NR_3$, $R_3$ represents a hydrogen atom, a linear or branched alkyl group having 1 to 6 carbon atoms or a substituted or unsubstituted aryl group, providing that the chain in the alkyl group of $R_1$, $R_2$, or $R_3$, or in the alkoxy group of $R_1$ or $R_2$ optionally contains a carbonyl, ether or amide bond, M represents $H^+$, an alkali metal ion such as $Na^+$, $Li^+$, or $K^+$ or a cation such as a quaternary ammonium ion, and m represents a numerical value in the range between 0.2 and 2. This class of polymers was developed for the purpose of improving solubility and processability of electron-conductive polymers (Saida, et al., U.S. Pat. No. 5,648,453, Jul. 15, 1997). These polymers are also soluble in a wide range of solvents (including water) and are chemically compatible (miscible and mixable) with the proton-conductive polymers represented by Formula IV-VII, to be described later. These polymers exhibit higher electronic conductivity when both $R_1$ and $R_2$ are H, typically in the range of $5 \times 10^{-2}$ S/cm to 1.4 S/cm. These polymers are also proton-conductive (proton conductivity of $5 \times 10^{-4}$ S/cm to $1.5 \times 10^{-2}$ S/cm) and hence can be used in the presently invented catalyst composition, alone or in combination with another ion-conductive or electron-conductive polymer.

Polymers which are soluble in water and are electronically conductive may be prepared from a monomer that has, as a repeat unit, a thiophene or pyrrole molecule having an alkyl group substituted for the hydrogen atom located in the beta position of the thiophene or pyrrole ring and having a surfactant molecule at the end of the alkyl chain (Aldissi, et al., U.S. Pat. No. 4,880,508, Nov. 14, 1989):

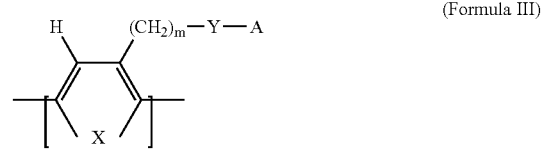

(Formula III)

In these polymers, the monomer-to-monomer bonds are located between the carbon atoms which are adjacent to X, the sulfur or nitrogen atoms. The number (m) of carbon atoms in the alkyl group may vary from 1 to 20 carbon atoms. The surfactant molecule consists of a sulfonate group (Y=$SO_3$), or a sulfate group (Y=$SO_4$), or a carboxylate group (Y=$CO_2$), and hydrogen (A=H) or an alkali metal (A=Li, Na, K, etc.). Synthesis of these polymers may be accomplished using the halogenated heterocyclic ring compounds 3-halothiophene or 3-halopyrrole as starting points; these are available from chemical supply houses or may be prepared by method known to those skilled in the art. The electronic conductivity of these polymers is typically in the range of $10^{-3}$ S/cm to 50 S/cm.

The ion- or proton-conductive polymer can be any polymer commonly used as a solid polymer electrolyte in a PEM-type fuel cell. These PEM materials are well-known in the art. One particularly useful class of ion-conductive polymers is the ion exchange membrane material having sulfonic acid groups. These materials are hydrated when impregnated with water, with hydrogen ion $H^+$ detached from sulfonic ion, $SO_3^-$. The general structure of the sulfonic acid membranes that have received extensive attention for use in fuel cells and are sold under the trade name Nafion® by E.I. du Pont Company is as follows:

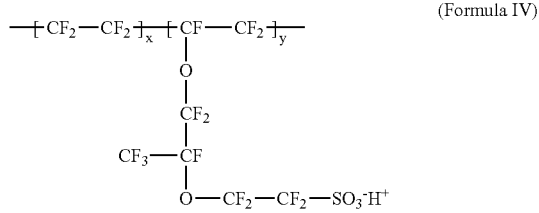
(Formula IV)

where x and y are integers selected from 1 to 100,000, preferably from 1 to 20,000, most preferably from 100 to 10,000. A similar polymer that is also suitable for use as a PEM is given as:

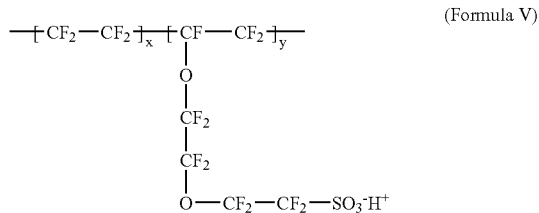
(Formula V)

Sulfonic acid polymers having a shorter chain between the pendant functional group (side group) and the main polymer backbone absorb less water at a given concentration of functional group in the polymer than do polymers having the general structure as shown by Formula IV and V. The concentration of functional group in the dry polymer is expressed as an equivalent weight. Equivalent weight is defined, and conveniently determined by standard acid-base titration, as the formula weight of the polymer having the functional group in the acid form required to neutralize one equivalent of base. In a more general form, this group of proton-conducting polymers may be represented by the formula:

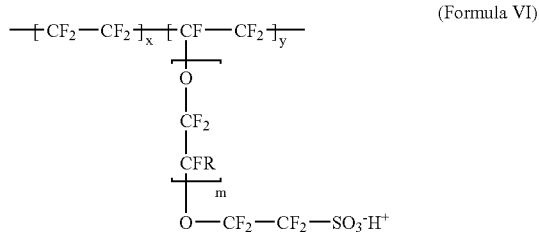
(Formula VI)

where x and y are integers selected from 1 to 100,000, m is an integer selected from 0 to 10 and R is a functional group selected from the group consisting of H, F, Cl, Br, I, and $CH_3$.

Another class of PEM polymer suitable for use as an ion-conductive polymer in the present invention is characterized by a structure having a substantially fluorinated backbone which has recurring pendant groups attached thereto and represented by the general formula:

—$O(CFR_f')_b$—$(CFR_f)_a$—$SO_3H$ (Formula VII)

where a=0-3, b=0-3, a+b=at least 1, $R_f$ and $R_f'$ are independently selected from the group consisting of a halogen and a substantially fluorinated alkyl group having one or more carbon atoms.

The above polymers have a detachable hydrogen ion (proton) that is weakly attached to a counter-ion (e.g., $SO_3^-$), which is covalently bonded to a pendant group of the polymer. While the general structures shown above are representative of several groups of polymers of the present invention, they are not intended to limit the scope of the present invention. It would become obvious to those skilled in the art, from the relationships presented herein that other sulfonic acid functional polymers having pendant chains, sterically hindered sulfonate groups or the like would absorb some water and conduct protons. For instance, the derivatives and copolymers of the aforementioned sulfonic acid polymers, alone or in combination with other polymers to form polymer blends, may also be used as an ion-conductive material in the invented fuel cell catalyst composition. The aforementioned polymers were cited as examples to illustrate the preferred mode of practicing the present invention. They should not be construed as limiting the scope of the present invention.

In summary, the ion- or proton-conducting polymer component of the desired mixture may be selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly(ether sulfone ketone), sulfonated poly(ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof. These materials have been used as solid electrolyte materials for various PEM-based fuel cells due to their relatively good proton conductivity (typically between 0.1 S/cm and 0.001 S/cm).

Any of these ion-conductive materials can be mixed with an electron-conductive polymer to make a polymer blend or mixture that will be conductive both electronically and ionically. Such a mixture is prepared preferably by dissolving both the ion-conductive polymer and the electron-conductive polymer in a common solvent to form a polymer solution. In our co-pending application [Ser. No. 11/518,565 (Sep. 11, 2006)], catalyst particles are then added to this polymer solution to form a suspension, also referred to as a dispersion. Alternatively, catalyst particles may be dispersed in a liquid to obtain a suspension, which is then poured into the polymer solution to form a precursor composite catalyst composition. Nano-scaled catalyst particles may be selected from (but not limited to) commonly used transition metal-based catalysts such as Pt, Pd, Ru, Mn, Co, Ni, Fe, Cr, and their alloys or mixtures. They are commercially available in a fine powder form or in a liquid with these nano-scaled particles dispersed therein. They may be manufactured by a powder manufacturing method such as solution precipitation, sol-gel conversion, or spray-based powder production routes. The suspension containing dispersed catalyst particles (supported or unsupported) and a polymer or polymer mixture (both ion- and electron-conductive) may be coated (via dispensing, spraying, ink-jet printing, screen printing, painting, or brushing, etc.) onto a primary surface of a gas diffuser plate (electrically conductive electrode-backing layer such as a carbon paper or carbon cloth sheet). Upon removal of the liquid medium, the remaining ingredients form an electrode that is connected to this gas diffuser plate. Alternatively, the suspension may be deposited to one or both primary surfaces of a solid electrolyte membrane to produce a catalyst-coated membrane (CCM). With two diffuser plates sandwiching this CCM we have a membrane-electrode assembly (MEA).

Electro-catalyst particles used in the presently invented process and composition can be one of three types or their combinations: (1) unsupported catalyst particles; (2) supported catalysts, such as aggregate particles of carbon black supporting Pt particles; (3) nano-particles. Unsupported catalyst particles are catalyst particles that are not supported on the surface of another material. These include such materials as platinum black and platinum/ruthenium black which in their natural form are not necessarily nano-scaled in size. Supported catalysts include a catalytically active species dispersed on a support phase. Thus, one or more highly dispersed active species phases, typically metal or metal oxide clusters or crystallites, with dimensions on the order of about 0.5 nanometers to 10 nanometers that are dispersed over the surface of larger support particles (typically 10 nm to 0.1 μm). The support particles can be aggregated to form larger aggregate particles. For example, the support particles can be chosen from a metal oxide. (e.g., $RuO_2$, $In_2O_3$, ZnO, $IrO_2$, $SiO_2$, $Al_2O_3$, $CeO_2$, $TiO_2$ or $SnO_2$), aerogels, xerogels, carbon or a combination of the foregoing. Carbon black particles are popular materials for the dispersed catalytically active species. However, emerging nano-carbon materials such as carbon nanotubes (CNTs), nano-scaled graphene plates (NGPs) and graphitic nano-fibers (GNFs), as well as short carbon fiber segments and fine graphite powders may also be support materials.

Catalyst nano-particles are particles which have an average size of not greater than 100 nanometers (preferably smaller than 10 nanometers), and may be unsupported. The nano-particles most preferably have an average size of from about 0.5 to 2 nanometers. Catalyst nano-particles may comprise metals, metal oxides, metal carbides, metal nitrides or any other material that exhibits catalytic activity.

Hence, in a co-pending application [U.S. Ser. No. 11/522,580 (Sep. 19, 2006)] cited earlier, we disclosed a fuel cell electrode-producing process comprising (a) preparing a suspension of catalyst particles dispersed in a liquid medium containing a polymer dissolved or dispersed therein; (b) dispensing the suspension onto a primary surface of a substrate selected from an electronically conductive catalyst-backing layer (gas diffuser plate) or a solid electrolyte membrane; and (c) removing the liquid medium to form the electrode that is connected to or integral with the substrate, wherein the polymer is both ion-conductive and electron-conductive and the polymer forms a matrix material in physical contact with the catalyst particles (polymer being coated on the catalyst particles or particles being embedded in the polymer). Again, the resulting electrode that contains an ion- and electron-conductive matrix material helps to form two networks of charge transport paths, one for electrons and the other for protons.

Alternatively, in the present invention, the electro-catalyst particles may be produced in-situ by delivering the suspension that contains molecular precursors along with other ingredients to a substrate (e.g., a surface of a carbon paper or PEM layer) and converting the precursors to the catalytically active species after deposition via heating, UV curing, or a radiation-induced reaction.

A molecular metal precursor is a metal-containing molecular compound, comprising preferably a metal such as platinum, ruthenium, palladium, silver, nickel, cobalt, iron, manganese, or gold. For example, molecular precursors such as hydrogen hexachloroplatinate, ruthenium chloride hydrate, hydrogen hexachloropallidate, silver nitrate, nickel acetate or potassium tetra-chloroaurate can be reduced to form nano-scaled catalyst particles. The reducing agent can be any number of alcohols, diols or other reducing compounds such as methanol, ethanol, n-propanol, 2-propanol, n-butanol, 2-butanol, ethylene glycol, formaldehyde or N,N-dimethyl formamide. The particles are stabilized from aggregation by the adsorption of stabilizing polymer molecules on the particle surfaces. We have found that most of the aforementioned ion- and electron-conductive polymers or polymer mixtures can be dissolved in alcohol (methanol, ethanol, n-propanol, 2-propanol, n-butanol, 2-butanol), mixture of alcohol+water, ethylene glycol, formaldehyde or N,N-dimethyl formamide, which are also good reducing agents. We are also pleasantly surprised to find that these ion- and electron-conductive polymers are excellent stabilizing agents. These observations are highly significant since the resulting suspension or solution can be very simple in chemical composition: a liquid medium (e.g., alcohol), an ion- and electron-conductive polymer (e.g., sulfonated polyaniline), and a molecular metal precursor (e.g., hydrogen hexachloroplatinate). Carbon black particles can be added to serve as a support for the converted catalyst. These particles are well-stabilized by the dissolved polymer.

Preferred metals for the supported electro-catalytically active species include noble metals, particularly Pt, Ag, Pd, Ru, Os and their alloys. The metal phase can also include a metal selected from the group Ni, Rh, Ir, Co, Cr, Mo, W, V, Nb, Al, Ta, Ti, Zr, Hf, Zn, Fe, Cu, Ga, In, Si, Ge, Sn, Y, La, lanthanide metals and combinations or alloys of these metals. Preferred metal alloys include alloys of Pt or Pd with other metals, such as Ru, Os, Cr, Ni, Mn, Fe, and Co. Particularly preferred among these is PtRu for use in the DMFC anode and PtCrCo or PtNiCo for use in the cathode.

Alternatively, metal oxide-carbon electro-catalyst particles that include a metal oxide active species dispersed on a carbon support phase may be used. The metal oxide can be selected from the oxides of the transition metals, preferably those existing in oxides of variable oxidation states, and most preferably from those having an oxygen deficiency in their crystalline structure. For example, the metal oxide-based catalytically active species can be an oxide of a metal selected from the group consisting of Au, Ag, Pt, Pd, Ni, Co, Rh, Ru, Fe, Mn, Cr, Mo, Re, W, Ta, Nb, V, Hf, Zr, Ti or Al. A particularly preferred metal oxide active species is manganese oxide ($MnO_x$, where x is 1 to 2). The supported active species can include a mixture of different oxides, solid solutions of two or more different metal oxides or double oxides. The metal oxides can be stoichiometric or non-stoichiometric and can be mixtures of oxides of one metal having different oxidation states.

In a particularly preferred embodiment, the molecular metal precursors are selected from low temperature precursors, such as those that have a relatively low decomposition or conversion temperature. The term molecular metal precursor refers to a molecular compound that includes a metal atom. Examples include organo-metallics (molecules with carbon-metal bonds), metal organics (molecules containing organic ligands with metal-to-nonmetal bonds) and inorganic compounds such as metal nitrates, metal halides and other metal salts. The molecular metal precursor compounds that eliminate ligands by a radical mechanism upon conversion to metal are preferred, especially if the species formed are stable radicals and therefore lower the decomposition temperature of that precursor compound. Therefore, preferred precursors to metals used for conductors are carboxylates, alkoxides or combinations thereof that convert to metals, metal oxides or mixed metal oxides by eliminating small molecules such as carboxylic acid anhydrides, ethers or esters. Metal carboxylates, particularly halogenocarboxylates such as fluorocarboxylates, are particularly preferred metal precursors due to their high solubility Particularly preferred molecular metal precursor compounds are metal precursor compounds containing silver, nickel, platinum, gold, palladium, cobalt, iron, manganese, copper and ruthenium. In one preferred embodiment of the present invention, the molecular metal precursor compound comprises platinum. Various molecular precursors can be used for platinum metal. Preferred molecular precursors for platinum include nitrates, carboxylates, beta-diketonates, and compounds containing metal-carbon bonds. Divalent platinum(II) complexes are particularly preferred. Preferred molecular precursors also include ammonium salts of platinates such as ammonium hexachloro platinate $(NH_4)_2PtCl_6$, and ammonium tetrachloro platinate $(NH_4)_2PtCl_4$; sodium and potassium salts of halogeno, pseudohalogeno or nitrito platinates such as potassium hexachloro platinate $K_2PtCl_6$, sodium tetrachloro platinate $Na_2PtCl_4$, potassium hexabromo platinate $K_2PtBr_6$, potassium tetranitrito platinate $K_2Pt(NO_2)_2$; dihydrogen salts of hydroxo or halogeno platinates such as hexachloro platinic acid $H_2PtCl_6$, hexabromo platinic acid $H_2PtBr_2$, dihydrogen hexahydroxo platinate $H_2Pt(OH)_2$; diammine and tetraammine platinum compounds such as diammine platinum chloride $Pt(NH_3)_2Cl_2$, tetraammine platinum chloride $[Pt(NH_3)_4]Cl_2$, tetraammine platinum hydroxide $[Pt(NH_3)_4](OH)_2$, tetraammine platinum nitrite $[Pt(NH_2)_4](NO_2)_2$, tetrammine platinum nitrate $Pt(NH_2)_4(NO_3)_2$, tetraammine platinum bicarbonate $[Pt(NH_3)_4](HCO_3)_2$, tetraammine platinum tetrachloroplatinate $[Pt(NH_3)_4]PtCl_4$; platinum diketonates such as platinum (II) 2,4-pentanedionate $Pt(C_5H_7O_2)_2$; platinum nitrates such as dihydrogen hexahydroxo platinate $H_2Pt(OH)_2$ acidified with nitric acid; other platinum salts such as Pt-sulfite and Pt-oxalate; and platinum salts comprising other N-donor ligands such as $[Pt(CN)_2]^{4+}$.

Platinum precursors useful in organic-based ink suspension compositions include Pt-carboxylates or mixed carboxylates. Examples of carboxylates include Pt-formate, Pt-acetate, Pt-propionate, Pt-benzoate, Pt-stearate, Pt-neodecanoate. Other precursors useful in organic ink composition include aminoorgano platinum compounds including Pt(diaminopropane) (ethylhexanoate). Preferred combinations of platinum precursors and solvents include: $PtCl_4$ in $H_2O$; Pt-nitrate solution from $H_2Pt(OH)_6$; $H_2Pt(OH)_6$ in $H_2O$; $H_2PtCl_6$ in $H_2O$; and $[Pt(NH_2)_4](NO_3)_2$ in $H_2O$.

Additional examples of molecular metal precursor materials are metal porphyrin complexes which catalyze the reduction of $O_2$ to $OH^-$ but are oxidized during the oxidation of $OH^-$. Included in this group are metal porphyrin complexes of Co, Fe, Zn, Ni, Cu, Pd, Pt, Sn, Mo, Mn, Os, Ir and Ru. Other metal ligand complexes can be active in these catalytic oxidation and reduction reactions and can be formed by the methods described herein. Such metal ligands can be selected from the class of $N_4$-metal chelates, represented by porphyrins, tetraazaanulens, phtalocyanines and other chelating agents. In some cases the organic ligands are active in catalyzing reduction and oxidation reactions. In some cases the ligands are active when they remain intact, as might be the case for an intact porphyrin ring system, or they might be partially reacted during thermal processing to form a different species that could also be active in the catalytic reactions. An example is the reaction product derived from porphyrins or other organic compounds.

Molecular metal precursors with decomposition temperatures below about 300° C. allow the formation of catalyst particles coated with an ion- and electron-conductive coating on a substrate such as a PEM layer or a sheet of carbon paper. This enables the liquid medium, a molecular metal precursor and a conducting polymer to be processed at low temperatures to form the desired electrode structure. In one embodiment, the conversion temperature is not greater than about 250° C., such as not greater than about 200° C., more preferably is not greater than about 150° C. and even more preferably is not greater than about 100° C. The conversion temperature is the temperature at which the metal species contained in the molecular metal precursor compound is substantially (at least 95 percent) converted to the pure metal.

Figure 8A:
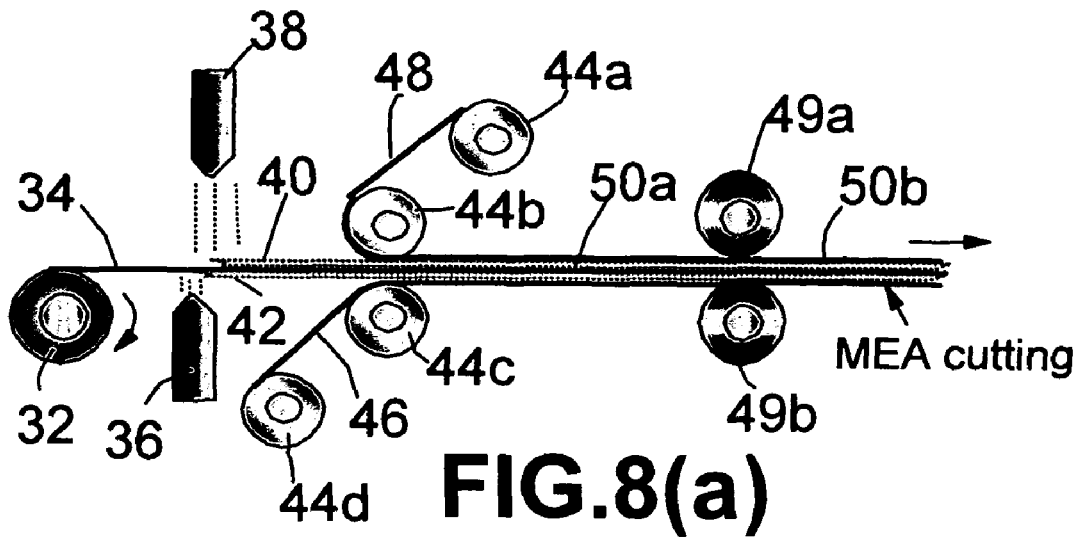
FIG. 8 (a) Schematic of a process for producing a membrane-electrode assembly on a continuous basis; (b) Another process for producing a membrane-electrode assembly on a continuous basis; and (c) A process for producing a catalyst-coated membrane using the presently invented precursor electro-catalyst composition.

A very significant feature of the present invention is the notion that the presence of an ion- and electron-conductive polymer affords us an exceptionally high degree of freedom in processing fuel cell electrodes, catalyst-coated membranes, and membrane-electrode assemblies without having to worry about such issues as disrupting the electron-conducting path or burying the carbon-supported catalyst particles deep into the PEM layer (which is otherwise not electron-conductive). We are free to dispense the suspension to and form an electrode on either a primary surface of a carbon paper sheet or a PEM film. The resulting coating material, being both ion- and electron-conductive, provides a bridge to establish two networks of charge transport. This feature also allows us to laminate PEM, electrode, and diffuser layers together to form an MEA with a wide processing window (e.g., the lamination pressure can be higher without inducing the detrimental effect of incapacitating a significant proportion of catalyst particles by, for instance, burying them too deep into a PEM layer). The features of simple catalyst suspension compositions and ease of producing electrodes also enables the mass-production of MEAs on a continuous basis using a highly advantageous roll-to-roll process, explained as follows:

Referring to FIG. 8(a), a process that can be used to convert a precursor composition to a catalytic film to form a CCM may include feeding a solid electrolyte membrane 34 intermittently or continuously from a feed roller 32. Two liquid dispensers 36, 38 are employed to deliver a suspension from each side of membrane 34 onto its two primary surfaces (top and bottom surfaces shown in this figure). By removing the liquid medium from the suspension and converting the precursor molecular metal via heat or energy beam, one obtains catalytic electrodes 40, 42 that are connected to the two respective primary surfaces of the membrane to form a three-layer catalyst-coated membrane (CCM). At the same time, gas diffuser layers 46, 48 (continuous sheets of carbon paper or cloth) are fed from two sets of rollers, 44a, 44b and 44c, 44d, to sandwich the CCM layer to form a membrane-electrode assembly 50a or 50b, which is being pulled or supported by a set of rollers 49a, 49b. A cutting device may be provided to slice the MEA 50b into individual MEA pieces for use in a fuel cell system.

Figure 8B:
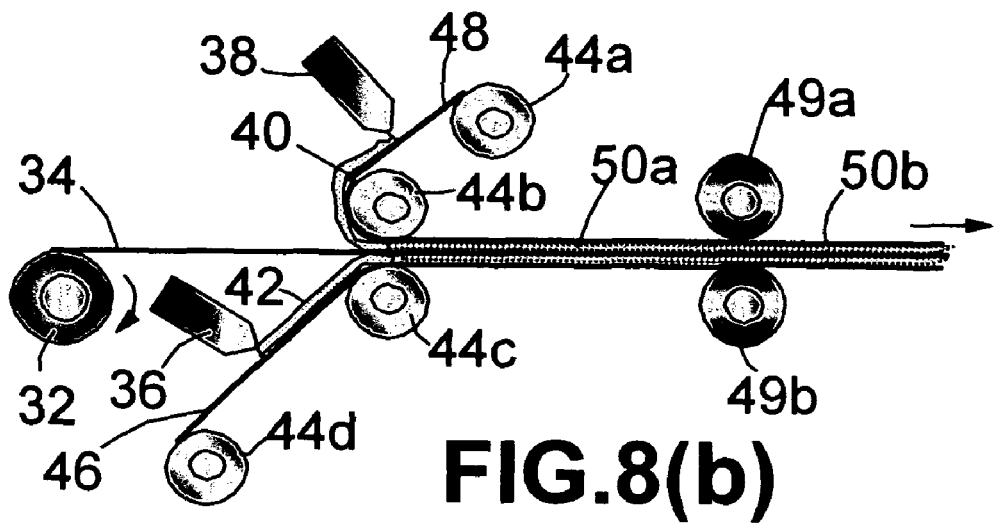

Alternatively, referring to FIG. 8(b), the process may include feeding a solid electrolyte membrane 34 intermittently or continuously from a feed roller 32. Two liquid dispensers 36, 38 are employed to deliver a suspension onto a primary surface of a gas diffuser layer, 46 or 48. By removing the liquid medium from the suspension and converting the precursor molecular metal, one obtains catalytic electrodes 40, 42 that are connected to the two respective primary surfaces of the diffuser layers 46, 48. At the same time, catalytic electrode-coated gas diffuser layers 46, 48 are fed from two sets of rollers, 44a, 44b and 44c, 44d, to sandwich the membrane layer 34 to form a membrane-electrode assembly 50a or 50b, which is being pulled or supported by a set of rollers 49a, 49b. A cutting device may be provided to slice the MEA 50b into individual MEA pieces for use in a fuel cell system.

Figure 8C:
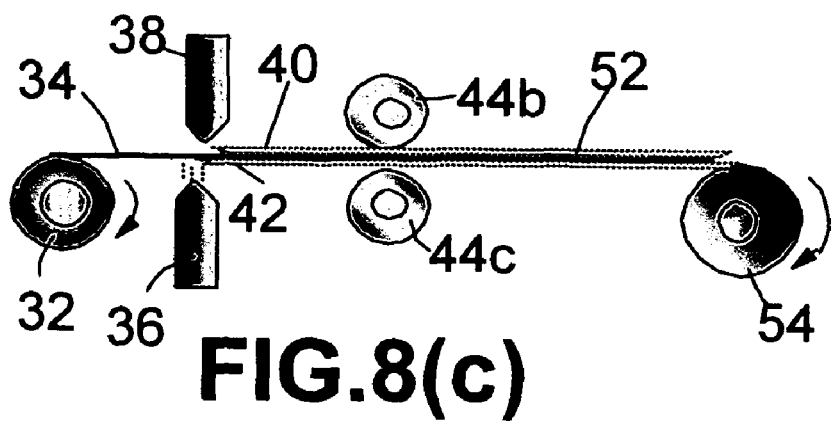

Another alternative arrangement, schematically shown in FIG. 8(c), entails a roll-to-roll process that begins with feeding a solid electrolyte membrane 34 intermittently or continuously from a feed roller 32. Two liquid dispensers 36, 38 are employed to deliver a suspension from each side of membrane 34 onto its two primary surfaces (top and bottom surfaces shown in this figure). By removing the liquid medium from the suspension and converting the precursor molecular metal, one obtains catalytic electrodes 40, 42 that are connected to the two respective primary surfaces of the membrane to form a three-layer catalyst-coated membrane 52. This CCM may be wound around a take-up roller 54 for later uses. Such a process also allows for mass production of CCMs which are commonly regarded as the most difficult fuel cell components to produce with consistent quality. The presently invented electro-catalyst composition ensures that two intertwine networks of charge transport for electrons and ions (e.g., protons) are always preserved, relatively independent of the actual processing conditions.

Figure 9:
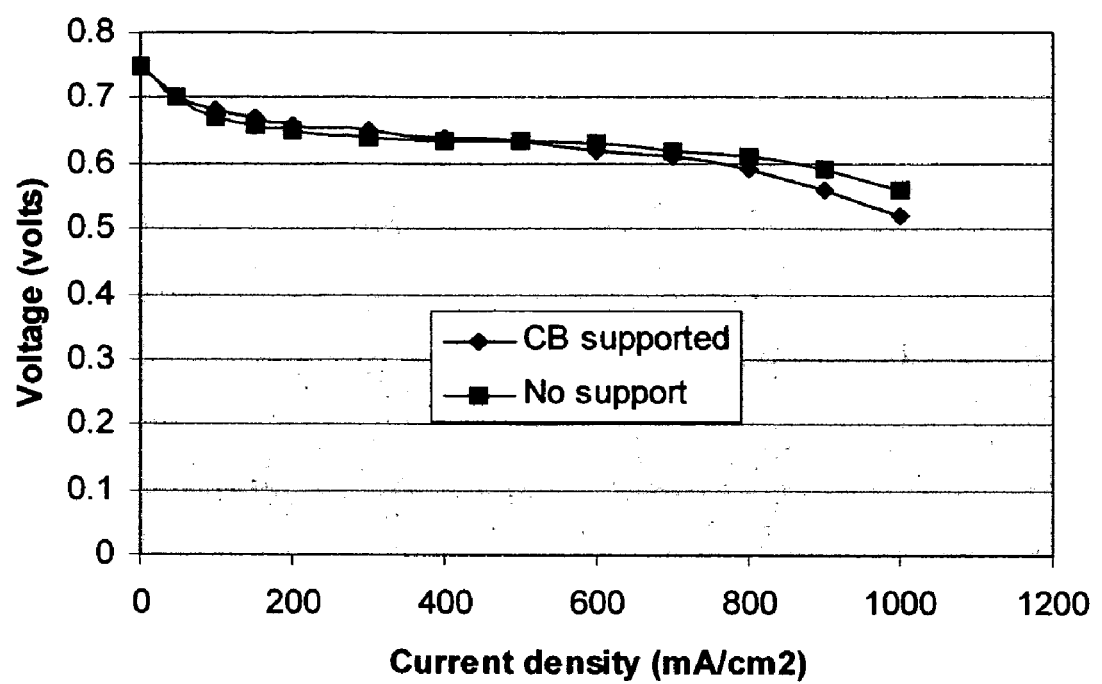
FIG. 9 The polarization curves of two fuel cells in accordance with a preferred embodiment of the present invention, one containing electro-catalyst particles supported on carbon black particles and the other containing un-supported electro-catalyst particles. The electrodes in both fuel cells comprise an electron- and proton-conducting polymer matrix with the electro-catalyst particles dispersed or embedded therein.

In a particularly preferred embodiment, the process may involve including a pore-forming means to produce pores in the resulting electrode. Pore-forming means are well known in the art. For instance, physical or chemical blowing or foaming agents commonly used in the production of foamed plastics can be incorporated in the suspension. Alternatively, aero gel forming techniques may be used to produce a high level of porosity in the resulting electrode wherein a large number of interconnected pores are formed with pore walls being sub-micron or nanometer in size and, hence, the catalyst particles are readily accessible by the fuel (e.g., hydrogen gas) and oxidant (oxygen gas) that diffuse through these pores. These pore walls are both ion- and electron-conductive. With such a microstructure, nano-scaled catalyst particles are normally well-dispersed in the pore wall, much like catalyst particles dispersed on the surface of carbon black (CB) particles, creating a large number of small three-phase zones where electro-chemical reactions can occur. In essence, the ion- and electron-conductive matrix polymer replaces CB as the support material. It is not necessary to disperse catalyst on CB particles as a separate process. The whole electrode-forming process becomes much simpler and less costly. Shown in FIG. 9 are the polarization curves of two fuel cells, one featuring carbon black-supported Pt catalyst particles (prepared in Example 3 discussed below) and the other featuring un-supported Pt particles of comparable amount (prepared in Example 5). The electrodes of the latter were prepared in such a way that the vaporizing solvent acted to leave behind a desirable level of pores pushing the Pt particles to reside near the pore walls. The two fuel cells exhibit comparable power outputs, but the latter was prepared by using a much simpler process.

The conductive particulate support material may be selected from the group consisting of carbon black, graphite particles, nano-scaled graphene plates (NGPs), carbon nanotubes (CNTs), graphitic nano-fibers (GNFs), short carbon fibers and combinations thereof. Particulate support materials with a high aspect ratio (e.g., length-to-diameter and length-to-thickness ratios) such as NGPs, GNFs, and CNTs are of particular interest since they can more easily or readily form an interconnected network of conducting paths at a lower amount of support material.

EXAMPLE 1

Preparation of Poly(Alkyl Thiophene) as an Electron-Conductive Component

Water-soluble conductive polymers having a thiophene ring (X=sulfur) and alkyl groups containing 4, 6, 8, and 10 carbon atoms (m=4, 6, 8, or 10) in Formula III were prepared, according to a method adapted from Aldissi, et al. (U.S. Pat. No. 4,880,508, Nov. 14, 1989). The surfactant molecules of these polymers were sulfonate groups with sodium, hydrogen, or potassium. Conductivity of polymers of this invention in a self-doped state was from about $10^{-3}$ to about $10^{-2}$ S/cm. When negative ions from a supporting electrolyte used during synthesis were allowed to remain in the polymer, conductivities up to about 50 S/cm were observed. Conductivities of polymers without negative ions from a supporting electrolyte which were doped with vaporous sulfuric acid were about $10^2$ S/cm.

A doped poly(alkyl thiophene) (PAT) with Y=$SO_3H$ and A=H in Formula III that exhibited an electron conductivity of 12.5 S/cm was dissolved in water. A sulfonated poly(ether ether ketone) (PEEK)-based material called poly(phthalazinon ether sulfone ketone) (PPESK) was purchased from Polymer New Material Co., Ltd., Dalian, China. With a degree of sulfonation of approximately 93%, this polymer was soluble in an aqueous hydrogen peroxide ($H_2O_2$) solution. A water solution of 3 wt. % poly(alkyl thiophene) and an aqueous $H_2O_2$ solution of 3 wt. % sulfonated PPESK was mixed at several PPESK-to-PAK ratios and stirred at 70° C. to obtain several polymer blend solution samples.

Samples of poly(alkyl thiophene)-PPESK mixtures in a thin film form were obtained by casting the aforementioned solutions onto a glass plate, allowing water to evaporate. The proton and electron conductivity values of the resulting solid samples were then measured at room temperature. The results were shown in FIG. 5, which indicates that good electron and proton conductivities can be obtained within the range of 30-75% PPESK.

EXAMPLE 2

Inks (Suspensions) Containing Poly(Alkyl Thiophene), PPESK, Carbon Black-Supported Pt or Pt/Ru Carbon black-supported Pt and Pt/Ru catalyst particles were separately added and dispersed in two aqueous polymer blend solutions prepared in Example 1. The PPESK-to-PAK ratio selected in both solutions was 1:1. The viscosity of the resulting solutions (more properly referred to as suspensions or dispersions) was adjusted to vary between a tooth paste-like thick fluid and a highly dilute "ink", depending upon the amount of water used. These suspensions can be applied to a primary surface of a carbon paper or that of a PEM layer (e.g. Nafion or sulfonated PEEK sheet) via spraying, printing (ink-jet printing or screen printing), brushing, or any other coating means.

A suspension comprising carbon black-supported Pt particles dispersed in an aqueous solution of PPESK and PAK was brushed onto the two primary surfaces of a Nafion sheet with the resulting catalyst-coated membrane (CCM) being laminated between two carbon paper sheets to form a membrane electrode assembly (MEA). In this case, the electrode was characterized in that the carbon black along with the supported Pt nano-particles were coated by or embedded in an ion- and electron-conductive polymer blend. A similar MEA was made that contained conventional Nafion-coated catalyst particles, wherein Nation is only ion-conductive, but not electron-conductive. The two MEAs were subjected to single-cell polarization testing with the voltage-current density curves shown in FIG. 6. It is clear that coating the catalyst particles with an electron- and ion-conductive polymer mixture significantly increases the voltage output of a fuel cell compared with that of a conventional fuel cell with Nafion-coated catalysts. This implies a more catalyst utilization efficiency and less power loss (lesser amount of heat generated).

EXAMPLE 3

Sulfonated Polyaniline (S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by Formula I with $R_1$, $R_2$, $R_3$, and $R_4$ group being H, $SO_3^-$ or $SO_3H$ with the latter two being varied between 30% and 75% (degree of sulfonation between 30% and 75%). The proton conductivity of these $SO_3^-$- or $SO_3H$-based S-PANI) compositions was in the range of $3\times10^{-3}$ S/cm to $4\times10^{-2}$ S/cm and their electron conductivity of 0.1 S/cm to 0.5 S/cm when the degree of sulfonation was from approximately 30% to 75% (with y being approximately 0.4-0.6).

A sample with the degree of sulfonation of about 65% was dissolved in 0.1 M $NH_4OH$ up to approximately 20 mg/ml. A small amount of carbon-supported Pt was added to the S-PANi solution to obtain a suspension that contained approximately 5% by volume of solid particles. The suspension was sprayed onto the two primary surfaces of a Nafion PEM sheet with the resulting catalyst-coated membrane (CCM) being laminated between two carbon paper sheets to form a membrane electrode assembly (MEA). Prior to this lamination step, one surface of the carbon paper, the one facing the catalyst, was pre-coated with a thin layer of S-PANi via spraying of the S-PANi solution onto the paper surface and allowing the solvent to evaporate under a chemical fume hood. The resulting electrode was characterized in that the carbon black along with the supported Pt nano-particles were coated by or embedded in an ion- and electron-conductive polymer. The electrode was also porous, providing channels for fuel or oxidant transport. A similar MEA was made that contained conventional Nafion-coated catalyst particles, wherein Nafion is only ion-conductive, but not electron-conductive. The two MEAs were subjected to single-cell polarization testing with the voltage-current density curves shown in FIG. 7. These results demonstrate that embedding the catalyst particles with an electron- and ion-conductive polymer significantly increases the voltage output of a fuel cell compared with that of a conventional fuel cell with Nafion-coated catalysts.

EXAMPLE 4

Bi-Cyclic Conducting Polymers

The preparation of conductive polymers represented by Formula II having H for both $R_1$ and $R_2$, S for X, and $H^+$ for M was accomplished by following a procedure suggested by Saida, et al. (U.S. Pat. No. 5,648,453, Jul. 15, 1997). These polymers exhibit electronic conductivity in the range of $5\times10^{-2}$ S/cm to 1.4 S/cm and proton conductivity of $5\times10^{-4}$ S/cm $1.5\times10^{-2}$ S/cm.

Six polymer blends were prepared from such a bi-cyclic polymer (electron conductivity $\sigma_e$=1.1 S/cm and proton conductivity $\sigma_p$=$3\times10^{-3}$ S/cm) and approximately 50% by wt. of the following proton-conductive polymers: poly(perfluoro sulfonic acid) (PPSA), sulfonated PEEK (S-PEEK), sulfonated polystyrene (S-PS), sulfonated PPESK, sulfonated polyimide (S-PI), and sulfonated polyaniline (S-PANi). The conductivities of the resulting polymer blends are $\sigma_e$=0.22 S/cm and $\sigma_p$=$2\times10^{-2}$ S/cm for (bi-cyclic+PPSA), $\sigma_e$=0.2 S/cm and $\sigma_p$=$7\times10^{-3}$ S/cm for (bi-cyclic+S-PEEK), $\sigma_e$=0.23 S/cm and $\sigma_p$=$5.5\times10^{-3}$ S/cm for (bi-cyclic+S-PS), $\sigma_e$=0.19 S/cm and $\sigma_p$=$6\times10^{-3}$ S/cm for (bi-cyclic+S-PPESK), $\sigma_e$=0.21 S/cm and $\sigma_p$=$7.5\times10^{-3}$ S/cm for (bi-cyclic+S-PI), and $O_e$=0.75 S/cm and $\sigma_p$=$3\times10^{-3}$ S/cm for (bi-cyclic+S-PANi), These conductivity values are all within the acceptable ranges for these polymer blends to be a good coating material for the catalyst particles in a fuel cell electrode.

EXAMPLE 5

Suspension Comprising a Molecular Metal Precursor

Preferred molecular precursors include chloroplatinic acid ($H_2PtCl_6$—$H_2O$), tetraamineplatinum (II) nitrate ($Pt(NH_3)_4(NO_3)_2$), tetraamineplatinum (II) hydroxide ($Pt(NH_3)_4(OH)_2$), tetraamineplatinum (II) bis(bicarbonate) ($Pt(NH_3)_4(HCO_3)_2$), platinum nitrate ($Pt(NO_3)_2$), hexa-hydroxyplatinic acid ($H_2Pt(OH)_6$), platinum (II) 2,4-pentanedionate (Pt(acac)$_2$), and platinum (II) 1,1,1,5,5,5-hexafluoro 2,4-pentanedionate (Pt(hfac)$_2$). Other platinum precursors include Pt-nitrates, Pt-amine nitrates, Pt-hydroxides, Pt-carboxylates, $Na_2PtCl_4$, and the like. Typically, the Pt precursor was dissolved in either water or organic-based solvent up to 30% by weight concentration.

Using water solution as an example, chloroplatinic acid ($H_2PtCl_6$—$H_2O$) was dissolved in water for up to 15% by weight. On a separate basis, an aqueous ethanol solution of 3% by weight sulfonated polyaniline was prepared. The two solutions were mixed together to form a suspension which was stirred for 30 minutes. This suspension was divided up into two beakers with one of them being added with carbon black particles to serve as a catalyst support. A desired quantity of each suspension was cast onto a primary surface of each of two sheets of carbon paper to produce an electrode-coated carbon paper (or carbon paper-backed electrode). A Nafion-based PEM film was then sandwiched between the two carbon paper-supported electrodes to form a membrane electrode assembly. A molecular precursor conversion temperature of 250° C. was used to produce the catalyst particles. Actually, both chloroplatinic acid ($H_2PtCl_6$—$H_2O$) and hexa-hydroxyplatinic acid ($H_2Pt(OH)_6$) can be decomposed at a temperature lower than 150° C. while tetra-amineplatinum (II) nitrate ($Pt(NH_3)_4(NO_3)_2$, tetraamineplatinum (II) hydroxide ($Pt(NH_3)_4(OH)_2$), tetraamineplatinum (II) bis(bicarbonate) ($Pt(NH_3)_4(HCO_3)_2$), and platinum nitrate ($Pt(NO_3)_2$) can be decomposed at a temperature lower than 300° C. It may be noted that polyaniline-based polymers are stable up to 350° C. and, hence, the precursor conversion step would not adversely affect the structure of these conductive polymers. In some cases, the removal of the reaction product gases (e.g., $NH_3$) naturally leave behind pores in the electrode, which is a desirable feature since pores facilitate diffusion of fuel (hydrogen) and oxidant gases (oxygen).

EXAMPLE 6

The Preparation of Particles Including an Alloy of Palladium and Nickel

Palladium and nickel wires were subjected to a twin-wire arc-based nano particle production process. A high pulse current of 240 amps was used to create the arc. The Pd and Ni atoms in the vaporous phase collided and condensed to form nano particles of approximately 2-5 nm in size.

In addition, for the purpose of comparison, an aqueous solution was prepared including nickel and palladium as dissolved nitrates. The total of the metals in the mixture is 5 weight percent. The nickel and palladium were proportioned at 30/70 Pd/Ni by weight. The solution was sonicated for 30 minutes to ensure uniformity. A single transducer ultrasonic generator was then used to produce an aerosol, which was sent to a furnace at a temperature of 900° C. where particles were produced. The aerosol carrier gas comprises 95 percent nitrogen by volume and 5 percent hydrogen by volume. The resulting particles have a size range of 4 nm to 10 nm. Palladium and its alloys were particularly useful anode catalysts for direct formic acid fuel cell.

EXAMPLE 7
Production of a Membrane Electrode Assembly

The reaction between 1,3-divinyl-1,1,3,3-tetramethyldisiloxane and hexachloroplatinic acid led to Pt-based nano particles. The liquid reaction product contain approximately 18 wt.-% of platinum herein referred to as Pt-VTS. Pt-VTS can be decomposed at a relatively low temperature, e.g. by drying at a temperature of 110° C., and, hence, is a good candidate molecular metal precursor. Extremely finely divided, metallic platinum remained while the silicon content of the vinyl-substituted siloxanes could no longer be detected in the finished catalyst layers. Other suitable complex compounds of the precious metals iridium, ruthenium and palladium for use in practicing the present invention are dodecacarbonyltetrairidium ($Ir_4(CO)_{12}$), ($\eta^6$-benzene)($\eta^4$-cyclohexadiene)ruthenium(0) (($\eta^6$-$C_6H_6$)Ru($\eta^4$-1,3-$C_6H_8$)) and bis(dibenzylideneacetone)-palladium(0).

The reaction product Pt-VTS was prepared following the procedure suggested by U.S. Pat. No. 3,775,452. For instance, 20 parts by weight sodium carbonate were added to a mixture of 10 parts by weight $H_2PtCl_6.8H_2O$, 20 parts by weight 1,3-divinyl-1,1,3,3-tetramethyldisiloxane and 50 parts by weight ethanol. The mixture was boiled for 15 minutes and then a solution of sulfonated polyaniline in ethanol-water and Vulcan XC72 carbon black were added to the boiling mixture. The resulting suspension was subjected to sonification for 30 minutes and then dispensed and deposited onto two primary surfaces of a Nafion-115 film to produce a catalyst-coated membrane, which was then sandwiched between two sheets of carbon paper to produce a membrane-electrode assembly.

What is claimed is:

1. A precursor electro-catalyst composition for producing a fuel cell electrode, said composition being formed of (a) a molecular metal precursor dissolved or dispersed in a liquid medium and (b) a polymer dissolved or dispersed in said liquid medium; wherein said molecular metal precursor is an organo-metallic compound having at least a carbon-metal bond or a metal organic compound containing at least an organic ligand with a metal-to-non-metal bond, the precursor being convertible by application of heat and/or energy beam to form nanometer-scaled unsupported catalyst particles; and said polymer forms a dispersing matrix that is in physical contact with said unsupported catalyst particles dispersed therein when said liquid medium is removed, and wherein said polymer is both ion-conductive and electron-conductive with an electronic conductivity no less than $10^{-4}$ S/cm and ionic conductivity no less than $10^{-5}$ S/cm.

2. An electro-catalyst composition derived from the precursor composition of claim 1.

3. The precursor composition as defined in claim 1, wherein said electronic conductivity is no less than $10^{-2}$ S/cm and said ionic conductivity is no less than $10^{-3}$ S/cm.

4. The precursor composition as defined in claim 1, wherein said polymer comprises a mixture of an electronically conductive polymer and a proton-conducting polymer selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly(ether ketone), sulfonated poly (ether sulfone ketone), sulfonated poly(ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends and combinations thereof.

5. The precursor composition as defined in claim 1, wherein said polymer comprises an electronically conducting polymer.

6. The precursor composition as defined in claim 1, wherein said polymer comprises an electronically conducting polymer selected from the group consisting of sulfonated polyaniline, sulfonated polypyrrole, sulfonated poly thiophene, sulfonated bi-cyclic polymers, their derivatives, and combinations thereof.

7. The precursor composition as defined in claim 1, wherein said polymer comprises a mixture of an ion-conducting polymer and an electron-conducting polymer.

8. The precursor composition as defined in claim 1 further comprising a conductive particulate support material selected from the group consisting of carbon black, graphite particles, nano-scaled graphene plates, carbon nanotubes, graphitic nano-fibers, short carbon fibers and combinations thereof.

9. The electro-catalyst composition as defined in claim 2 wherein said catalyst particles comprise a catalytically active material selected from the group consisting of transition metals, transition metal alloys, transition metal oxides, transition metal carbides, transition metal nitrides, and combinations thereof.

10. The electro-catalyst composition as defined in claim 2 wherein said catalyst particles comprise a catalytically active material selected from the group consisting of Pt, Ag, Pd, Ru, Os, Ni, Rh, Ir, Co, Cr, Mo, W, V, Nb, Al, Ta, Ti, Zr, Hf, Zn, Fe, Cu, Ga, In, Si, Ge, Sn, Y, La, lanthanide metals, and mixtures, alloys, and oxides of these metals.

11. The precursor composition as defined in claim 1, further comprising a pore-forming agent.

12. The precursor composition as defined in claim 8, further comprising a pore-forming agent.

13. An electrode, a catalyst-coated membrane, a membrane electrode assembly, or a fuel cell comprising the electro-catalyst composition as defined in claim 2.

14. An electrode, a catalyst-coated membrane, a membrane electrode assembly, or a fuel cell comprising the electro-catalyst composition as defined in claim 2 wherein said electro-catalyst composition comprises pores.

15. An electrode, a catalyst-coated membrane, a membrane electrode assembly, or a fuel cell comprising the electro-catalyst composition as defined in claim 2 wherein said electro-catalyst composition comprises pores that are substantially interconnected.

16. An electrode, a catalyst-coated membrane, a membrane electrode assembly, or a fuel cell comprising the electro-catalyst composition as defined in claim 2 wherein said electro-catalyst composition comprises pores and said catalyst particles are substantially disposed near a surface of said pores.

* * * * *